US012782150B2

(12) United States Patent
Pankov

(10) Patent No.: US 12,782,150 B2
(45) Date of Patent: Nov. 3, 2026

(54) SYSTEM FOR GENERATING A RECUPERATION ENERGY-EFFICIENT TRACK FOR THE VEHICLE

(71) Applicant: Boris Valerevich Pankov, Moscow (RU)

(72) Inventor: Boris Valerevich Pankov, Moscow (RU)

( * ) Notice: Subject to any disclaimer, the term of this patent is extended or adjusted under 35 U.S.C. 154(b) by 68 days.

(21) Appl. No.: 18/691,453

(22) PCT Filed: Jul. 12, 2022

(86) PCT No.: PCT/RU2022/050221

§ 371 (c)(1),
(2) Date: Mar. 12, 2024

(87) PCT Pub. No.: WO2023/282798

PCT Pub. Date: Jan. 12, 2023

(65) Prior Publication Data

US 2024/0393123 A1 Nov. 28, 2024

(30) Foreign Application Priority Data

Dec. 6, 2021 (RU) ................................ 2021135842

(51) Int. Cl.
*G01C 21/34* (2006.01)
*B60L 7/10* (2006.01)
(Continued)

(52) U.S. Cl.
CPC ............ *G01C 21/3469* (2013.01); *B60L 7/10* (2013.01); *F03G 7/081* (2021.08); *G08G 1/166* (2013.01)

(58) Field of Classification Search
CPC ....... G01C 21/3469; F03G 7/081; B60L 7/10; G08G 1/166
(Continued)

(56) References Cited

U.S. PATENT DOCUMENTS 5,781,119 A 7/1998 Yamashita et al.
6,226,588 B1 5/2001 Teramura et al.
(Continued)

FOREIGN PATENT DOCUMENTS

DE 102010029467 12/2011
EP 2477011 7/2012
(Continued)

OTHER PUBLICATIONS

Johannes Asamer et al.: ""Sensitivity analysis for energy demand estimation of electric vehicles"", https://www.sciencedirect.com/science/article/pii/S1361920915300250.
(Continued)

*Primary Examiner* — Luis A Martinez Borrero
(74) *Attorney, Agent, or Firm* — Chad Peterson

(57) ABSTRACT

The proposed invention relates to methods for controlling energy consumption by a motor vehicle, and can be used in transportation industry. The technical problem to be solved by the claimed invention is to provide a method, a device, a system, a motor vehicle, and a computer-readable medium that do not possess the drawbacks of the prior art and thus make it possible to generate an accurate energy-efficient track for a motor vehicle that allows to reduce energy consumption by the 15 motor vehicle moving along a portion of the route that contains a possible deceleration point, which can be used as an activation point for the vehicle's recuperation system.

19 Claims, 5 Drawing Sheets

(51) Int. Cl.
*F03G 7/08* (2006.01)
*G08G 1/16* (2006.01)

(58) Field of Classification Search
USPC .......................................................... 701/117
See application file for complete search history.

(56) References Cited

U.S. PATENT DOCUMENTS 6,282,492 B1 8/2001 Gorai et al.
8,155,868 B1 * 4/2012 Xing .................... G07C 5/0808 340/439
8,579,759 B2 * 11/2013 Akebono ............ B60W 30/186 477/6
9,294,733 B2 3/2016 Watanabe et al.
9,342,983 B1 5/2016 Brener et al.
9,346,466 B2 5/2016 Papajewski et al.
9,566,896 B2 2/2017 Armenta et al.
9,604,648 B2 3/2017 Tamari et al.
9,631,940 B2 4/2017 Eikelenberg et al.
9,725,093 B2 8/2017 Chunodkar et al.
9,818,088 B2 11/2017 Penilla et al.
9,994,234 B2 6/2018 Oguri
10,061,637 B1 8/2018 Halbersberg et al.
10,176,783 B2 1/2019 Travers et al.
10,269,260 B2 4/2019 Ellis
10,464,547 B2 * 11/2019 Park ........................ B60L 58/12
10,495,477 B2 12/2019 Engelhardt
10,504,052 B2 12/2019 Sugioka et al.
10,594,991 B1 3/2020 Skolnick
10,646,825 B2 5/2020 Kim
10,930,159 B1 2/2021 Jessen et al.
11,173,916 B2 11/2021 Dodo
11,193,778 B2 12/2021 Verheijen et al.
11,207,980 B2 * 12/2021 Koebler .................. B60L 58/12
11,279,359 B2 3/2022 Plianos et al.
11,390,165 B2 7/2022 Koebler et al.
11,518,393 B2 12/2022 Liu et al.
11,548,522 B2 1/2023 Szczerba et al.
11,738,750 B2 8/2023 Wessel et al.
11,760,208 B2 9/2023 Kwon
11,807,214 B2 * 11/2023 Tokura ................ B60W 40/105
11,975,706 B2 * 5/2024 Kono .................... B60W 20/14
2005/0154505 A1 7/2005 Nakamura et al.
2007/0171093 A1 7/2007 Jang
2008/0125958 A1 5/2008 Boss et al.
2008/0133120 A1 6/2008 Romanick
2009/0031741 A1 2/2009 Hara et al.
2009/0114463 A1 * 5/2009 DeVault ................ B60W 20/12 180/65.29
2009/0281715 A1 11/2009 Paik
2010/0057339 A1 3/2010 Pryakhin et al.
2010/0253594 A1 10/2010 Szczerba et al.
2010/0332373 A1 12/2010 Crabtree et al.
2011/0046835 A1 * 2/2011 Taguchi ................ B60W 10/06 903/902
2011/0166774 A1 7/2011 Schunder
2011/0208646 A1 8/2011 McMaster et al.
2011/0313647 A1 * 12/2011 Koebler ................. B60K 35/80 701/123
2012/0004839 A1 1/2012 Mizuno
2012/0022781 A1 1/2012 Wilson
2012/0068860 A1 * 3/2012 Popovic ........... G08G 1/096783 340/905
2012/0089327 A1 4/2012 Miura et al.
2012/0123657 A1 5/2012 Taguchi
2012/0271542 A1 10/2012 Arcot et al.
2013/0054125 A1 2/2013 Bruemmer et al.
2013/0091694 A1 * 4/2013 Hussain .................. B60L 50/16 180/65.265
2013/0096745 A1 * 4/2013 Hussain ................ B60W 20/12 180/65.265
2013/0096746 A1 * 4/2013 Hussain .......... B60W 30/18127 180/65.265
2013/0096747 A1 * 4/2013 Hussain ................ B60W 10/26 180/65.265
2013/0096748 A1 * 4/2013 Hussain ................ B60W 10/06 180/65.265
2013/0096749 A1 * 4/2013 Hussain ................ B60W 10/08 903/903
2013/0173147 A1 7/2013 Takeuchi et al.
2013/0261970 A1 10/2013 Papajewski et al.
2014/0032062 A1 1/2014 Baer et al.
2014/0032087 A1 1/2014 Shiri
2014/0277835 A1 * 9/2014 Filev .................. G01C 21/3469 701/2
2015/0019058 A1 * 1/2015 Georgiev ................ B60L 58/12 701/22
2015/0019117 A1 1/2015 Huber et al.
2015/0073692 A1 3/2015 Malikopoulos
2015/0094968 A1 4/2015 Jia et al.
2015/0183439 A1 7/2015 Jackson
2015/0224845 A1 * 8/2015 Anderson ............ B60G 17/019 701/37
2015/0232097 A1 8/2015 Luther et al.
2015/0241234 A1 8/2015 Ogawa
2016/0084661 A1 3/2016 Gautama et al.
2016/0129836 A1 5/2016 Sugita et al.
2016/0207521 A1 7/2016 Ogawa
2016/0221567 A1 8/2016 Ogawa
2017/0008467 A1 1/2017 Lindhuber
2017/0038219 A1 2/2017 Ziezold
2017/0066429 A1 * 3/2017 Ogawa .................. B60W 10/06
2017/0137023 A1 * 5/2017 Anderson .......... B60G 17/0195
2017/0146362 A1 5/2017 Bai
2017/0307391 A1 10/2017 Mason et al.
2017/0322041 A1 11/2017 Stephens et al.
2018/0031380 A1 2/2018 Lee et al.
2018/0037117 A1 * 2/2018 Koebler ................. B60K 35/28
2018/0079306 A1 3/2018 Kim et al.
2018/0082495 A1 * 3/2018 Koebler ................ B60W 50/14
2018/0099564 A1 4/2018 Koebler
2018/0113448 A1 4/2018 Nagda et al.
2018/0186375 A1 7/2018 Omeachair et al.
2018/0222478 A1 8/2018 Limbacher
2018/0244270 A1 8/2018 Tudosie
2018/0345885 A1 12/2018 Seger et al.
2018/0356835 A1 12/2018 Gehring et al.
2019/0017840 A1 1/2019 Okamoto et al.
2019/0113354 A1 * 4/2019 Matsumura ........ G01C 21/3469
2019/0152474 A1 5/2019 Sogabe
2019/0164451 A1 5/2019 Gaither et al.
2019/0170527 A1 6/2019 Inoue et al.
2019/0217844 A1 * 7/2019 Pursifull ........... B60W 50/0097
2019/0236959 A1 8/2019 Belapurkar et al.
2019/0248359 A1 8/2019 Miller et al.
2019/0283584 A1 * 9/2019 Koebler .................... B60L 3/12
2019/0283585 A1 * 9/2019 Koebler .................. B60L 58/12
2019/0283586 A1 * 9/2019 Koebler .................. B60L 58/12
2019/0283587 A1 * 9/2019 Koebler .................. B60L 58/12
2019/0283588 A1 * 9/2019 Koebler .................. B60L 58/12
2019/0283589 A1 * 9/2019 Koebler ................. B60K 35/10
2019/0283590 A1 * 9/2019 Koebler .................... B60L 3/12
2019/0283591 A1 * 9/2019 Koebler .................. B60L 58/12
2019/0283592 A1 * 9/2019 Koebler .................. B60L 58/12
2019/0283593 A1 * 9/2019 Koebler .................. B60L 58/12
2019/0283594 A1 * 9/2019 Koebler .................... B60L 7/10
2019/0283595 A1 * 9/2019 Koebler .............. B60L 15/2045
2019/0283596 A1 * 9/2019 Koebler .................... B60L 3/12
2019/0283597 A1 * 9/2019 Koebler .................. B60L 58/12
2019/0283598 A1 * 9/2019 Koebler .................. B60L 58/12
2019/0283599 A1 * 9/2019 Koebler .............. B60L 15/2045
2019/0283600 A1 * 9/2019 Koebler .................... B60L 3/12
2019/0283601 A1 * 9/2019 Koebler .................... B60L 3/12
2019/0283602 A1 * 9/2019 Koebler .................... B60L 3/12
2019/0283603 A1 * 9/2019 Koebler .................... B60L 3/12
2019/0283604 A1 * 9/2019 Koebler .................. B60L 58/12
2019/0283605 A1 * 9/2019 Koebler .................... B60T 7/18
2019/0283606 A1 * 9/2019 Koebler .................. B60L 58/12
2019/0322174 A1 * 10/2019 Koebler .................. B60L 8/003
2019/0322267 A1 * 10/2019 Kurihashi .............. B60K 6/445
2019/0359211 A1 11/2019 Matsumoto et al.
2020/0070679 A1 * 3/2020 Wang ...................... B60L 58/21

(56) References Cited

U.S. PATENT DOCUMENTS

| | | | | |
|---|---|---|---|---|
| 2020/0108829 | A1 | 4/2020 | Bauer | |
| 2020/0122588 | A1 | 4/2020 | Cserna et al. | |
| 2020/0191588 | A1 | 6/2020 | Park | |
| 2020/0290464 | A1* | 9/2020 | Oh | B60W 40/13 |
| 2020/0361476 | A1 | 11/2020 | Gaither et al. | |
| 2020/0391593 | A1 | 12/2020 | Lee et al. | |
| 2021/0009128 | A1* | 1/2021 | Jokela | B60W 20/12 |
| 2021/0138909 | A1* | 5/2021 | Tokura | B60W 40/105 |
| 2021/0179063 | A1* | 6/2021 | Tokura | B60W 20/13 |
| 2021/0185608 | A1 | 6/2021 | Ali et al. | |
| 2021/0192975 | A1 | 6/2021 | Spence et al. | |
| 2021/0213948 | A1 | 7/2021 | Lahti et al. | |
| 2021/0253128 | A1* | 8/2021 | Nister | B60W 50/0097 |
| 2021/0269029 | A1 | 9/2021 | Fendt | |
| 2021/0291868 | A1* | 9/2021 | Okuda | B60W 60/0015 |
| 2021/0294351 | A1 | 9/2021 | Wiberg | |
| 2021/0387525 | A1 | 12/2021 | Gruenig | |
| 2021/0403082 | A1 | 12/2021 | Funke et al. | |
| 2022/0067848 | A1* | 3/2022 | Lu | G06F 16/909 |
| 2022/0073070 | A1 | 3/2022 | Niewiadomski | |
| 2022/0089024 | A1 | 3/2022 | Aoyama | |
| 2022/0114885 | A1* | 4/2022 | Ran | B60W 60/00 |
| 2022/0126810 | A1* | 4/2022 | Tokura | B60W 20/20 |
| 2022/0153272 | A1* | 5/2022 | Tokura | B60W 10/08 |
| 2022/0299328 | A1 | 9/2022 | Pankov | |
| 2022/0363129 | A1 | 11/2022 | Pankov | |
| 2022/0363130 | A1 | 11/2022 | Pankov | |
| 2022/0363285 | A1 | 11/2022 | Pankov | |
| 2022/0366740 | A1 | 11/2022 | Pankov | |
| 2022/0371580 | A1 | 11/2022 | Kusumoto et al. | |
| 2022/0373341 | A1 | 11/2022 | Pankov | |
| 2022/0373342 | A1 | 11/2022 | Pankov | |
| 2022/0373343 | A1 | 11/2022 | Pankov | |
| 2022/0373344 | A1 | 11/2022 | Pankov | |
| 2023/0039738 | A1* | 2/2023 | Beaurepaire | G08G 1/0129 |
| 2023/0160707 | A1 | 5/2023 | Kiblama et al. | |
| 2023/0278422 | A1 | 9/2023 | Pankov | |
| 2023/0280174 | A1 | 9/2023 | Pankov | |
| 2024/0183675 | A1* | 6/2024 | Pankov | G01C 21/3453 |
| 2024/0328796 | A1 | 10/2024 | Pankov | |
| 2024/0328797 | A1 | 10/2024 | Pankov | |
| 2024/0328798 | A1 | 10/2024 | Pankov | |
| 2024/0385002 | A1 | 11/2024 | Pankov | |
| 2024/0393122 | A1 | 11/2024 | Pankov | |
| 2024/0393123 | A1 | 11/2024 | Pankov | |
| 2024/0401959 | A1 | 12/2024 | Pankov | |
| 2024/0410709 | A1 | 12/2024 | Pankov | |
| 2024/0418521 | A1* | 12/2024 | Pankov | G01C 21/3469 |
| 2025/0012585 | A1 | 1/2025 | Pankov | |
| 2025/0014467 | A1* | 1/2025 | Pankov | G01C 21/3469 |

FOREIGN PATENT DOCUMENTS

| | | |
|---|---|---|
| EP | 2614997 | 7/2013 |
| FR | 2811440 | 1/2002 |
| JP | 2001124575 | 5/2001 |
| JP | 2012208829 | 10/2012 |
| JP | 2015132613 | 7/2015 |
| KR | 101526431 | 6/2015 |
| RU | 2407060 | 8/2009 |
| RU | 2436163 | 7/2010 |
| RU | 2523192 | 1/2013 |
| RU | 2548649 | 10/2014 |
| RU | 2015103750 | 8/2016 |
| RU | 2681506 | 3/2019 |
| RU | 2741818 | 1/2021 |
| RU | 2764469 | 1/2022 |
| RU | 2764741 | 1/2022 |
| RU | 2765268 | 1/2022 |
| WO | 2010074668 | 7/2010 |
| WO | 2012039405 | 3/2012 |

OTHER PUBLICATIONS

Egor Kulik et al.: ""Estimation of the requirements for hybrid electric powertrain based on analysis of vehicle trajectory using GPS and accelerometer data"", 2018: https://ieeexplore.ieee.org/abstract/document/8321394.

Camiel J.J.Beckers et al.: ""Assessing the impact of cornering losses on the energy consumption of electric city buses"", 2020, https://www.sciencedirect.com/science/article/pii/S1361920920305472.

Irfan Ullah et al.: ""Electric vehicle energy consumption prediction using stacked generalization: an ensemble learning approach"", Feb. 26, 2021, https://www.tandfonline.com/doi/abs/10.1080/15435075.2021.1881902.

Bozorgi Amier et al.: ""A Time and Energy Efficient Routing Algorithm for Electric Vehicles Based on Historical Driving Data"", Nov. 2017, https://www.researchgate.net/publication/320953773_A_Time_and_Energy_Efficient_Routing_Algorithm_for_Electric_Vehicles_Based_on_Historical_Driving_Data.

Various Search Reports from the Russian Federal Institute of Industrial Property (with English translations).

European (EPO) Search Opinion for EP4026746.

Supplemental European (EPO) Search Report for EP4026746.

Gauthier, Porsche's Augmented Reality HUD Could Show The Ideal Racing Line and 'Ghost' Cars, Sep. 18, 2018, www.carscoops.com/2018/09/porches-augmented-reality-hud-show-ideal-racing-line-ghost-cars.

George, A Head-up Display For Your Car That Lets You Race Yourself, Oct. 27, 2014, www.wired.com/2014/10/hud-brings-ghost-cars-to-the-track.

GhostDash: Augmented Reality Ghost Car and HUD, Apr. 27, 2019, web.archive.org/web/20190427073619/https://www.kickstarter.com/projects/ghostdash/ghostdash-augmented-reality-ghost-car-and-hud.

U.S. Appl. No. 18/580,150 (Pankov), filed Jan. 17, 2024.

U.S. Appl. No. 18/580,536 (Pankov), filed Jan. 18, 2024.

U.S. Appl. No. 18/699,878 (Pankov), filed Apr. 9, 2024.

U.S. Appl. No. 18/720,636 (Pankov), filed Jun. 15, 2024.

U.S. Appl. No. 18/720,637 (Pankov), filed Jun. 15, 2024.

U.S. Appl. No. 18/720,638 (Pankov), filed Jun. 15, 2024.

U.S. Appl. No. 18/720,639 (Pankov), filed Jun. 15, 2024.

U.S. Appl. No. 18/833,275 (Pankov), filed Jul. 25, 2024.

U.S. Appl. No. 19/025,136 (Pankov), filed Jan. 16, 2025.

International Search Report and Written Opinion for PCT/RU2020/050221, Dec. 1, 2022.

International Search Report and Written Opinion for PCT/RU2020/050189, Dec. 10, 2020.

International Search Report and Written Opinion for PCT/RU2022/050066, Jul. 7, 2022.

International Search Report and Written Opinion for PCT/RU2022/050067, Jun. 30, 2022.

International Search Report and Written Opinion for PCT/RU2022/050111, Aug. 4, 2022.

International Search Report and Written Opinion for PCT/RU2022/050176, Oct. 13, 2022.

International Search Report and Written Opinion for PCT/RU2022/050361, Mar. 9, 2023.

International Search Report and Written Opinion for PCT/RU2022/050364, Mar. 2, 2023.

International Search Report and Written Opinion for PCT/RU2022/050400, May 11, 2023.

International Search Report and Written Opinion for PCT/RU2022/050401, May 18, 2023.

Office Action for U.S. Appl. No. 18/580,536, filed Oct. 1, 2025, 35 pages.

* cited by examiner

SYSTEM FOR GENERATING A RECUPERATION ENERGY-EFFICIENT TRACK FOR THE VEHICLE

CROSS-REFERENCE TO RELATED APPLICATIONS

The present application is a 371 of International Patent Application No. PCT/RU2022/050221, filed Jul. 12, 2022, and claims priority to Russian Patent Application No. 2021135842, filed Dec. 6, 2021, all of which are incorporated by reference herein in their entirety.

FIELD OF INVENTION

The proposed invention relates to methods for controlling energy consumption by a motor vehicle, and can be used in transportation industry.

BACKGROUND OF THE INVENTION

There is a known method for evaluating the fuel efficiency of a motor vehicle disclosed in patent KR101526431B1, published on Jun. 5, 2015 on 12 sheets (D1). The method of D1 is implemented by a device for evaluating the fuel efficiency of a motor vehicle, the device comprising: a data collection unit that collects data on driving, as well status and identification data of a plurality of motor vehicles, including the first motor vehicle; a driving index calculator that calculates driving indexes of each motor vehicle based on their driving data; a means for extracting an analogous group that extracts a group of motor vehicles, which are similar to the first motor vehicle, from a plurality of motor vehicles, based on their driving indexes and status data; a means for fuel efficiency evaluation that evaluates the fuel efficiency of the first motor vehicle based on its driving data and identification data in the analogous group; and a means for controlling a motor vehicle that controls the method of steering the motor vehicle or the method for improving the driving of the first motor vehicle, based on the fuel efficiency evaluation. According to the invention, the fuel efficiency of a motor vehicle can be evaluated with precision taking into account driver's habits and the current condition of the vehicle. In addition, the method of steering the motor vehicle and the driving mode based on the assessment of the vehicle's fuel are provided to the driver, so that he/she can improve his/her driving efficiency and the efficiency of steering the motor vehicle, as well as reduce the cost of vehicle maintenance.

The method disclosed in D1 does not use the information on the specific portion of the route that was covered by the first motor vehicle, which reduces the accuracy of fuel consumption estimation. In addition, the method disclosed in D1 uses the information obtained from motor vehicles with similar specifications and similar driving mode only, which prevents the method from being used in a global fuel consumption control system comprising multiple motor vehicles with different specifications. In addition, the method disclosed in D1 is used to identify operational problems of motor vehicles that affect the fuel consumption levels and require certain vehicle parts to be repaired or replaced, and so this method cannot be used to change the motor vehicle driving mode in order to reduce the energy consumption on a given portion of the route. In addition, the solution disclosed in D1 does not propose any specific or special means or methods to generate a model of the motor vehicle moving in an urban area, particularly, environment containing mandatory deceleration points resulting from movement trajectories along corresponding portions of the route, actual or estimated presence of other motor vehicles, including on other portions of the route, and signals from the infrastructure of the portion of the route. The method disclosed in D1 can be considered the closest prior art to the claimed invention.

BRIEF SUMMARY OF THE INVENTION

The technical problem to be solved by the claimed invention is to provide a method, a device, a system, a motor vehicle, and a computer-readable medium that do not possess the drawbacks of the prior art and thus make it possible to generate an accurate energy-efficient track for a motor vehicle that allows to reduce energy consumption by the motor vehicle moving along a portion of the route that contains a possible deceleration point, which can be used as an activation point for the vehicle's recuperation system.

The objective of the claimed invention is to overcome the drawbacks of the prior art and thus to reduce energy consumption by the motor vehicle moving along a portion of the route that includes a possible deceleration point, which can be used as an activation point for the vehicle's recuperation system.

The objective of the present invention is achieved by a method for generating a recuperation energy-efficient track for the vehicle in operation equipped with a braking electric recuperation system moving along a portion of the route that includes a possible deceleration point, that is performed by the computer's CPU, the method comprising at least the following steps: collecting primary data, which involves obtaining data associated with the first motor vehicle equipped with the braking electric recuperation system; data associated with the portion of the route to be passed by the first motor vehicle, and data associated with the second motor vehicle, wherein the second motor vehicle is also the vehicle in operation and passes the portion of the route after the first motor vehicle, and wherein the data associated with the portion of the route include at least data associated with a possible deceleration point; collecting secondary data, which involves generating a track for the first motor vehicle, wherein said track is generated based on how the first motor vehicle passed the portion of the route, and wherein the electric recuperation system is activated when the first motor vehicle is braking while moving along a portion of the route and passing the possible deceleration point; generating an estimated track for the second motor vehicle, wherein said estimated track is generated based on the track generated for the first motor vehicle; wherein the track for the first motor vehicle is generated by performing the following steps: generating a speed profile of the first motor vehicle on the passed portion of the route, and evaluating energy efficiency of the first motor vehicle on the passed portion of the route; wherein energy efficiency of the first motor vehicle on the passed portion of the route is evaluated on the basis of efficiency of the braking electric recuperation system of the first motor vehicle; wherein the data associated with a possible deceleration point include one of the following: data associated with a mandatory deceleration point, data associated with a non-mandatory deceleration point, and/or a combination thereof; wherein the data associated with a mandatory deceleration point include one of the following: data associated with a mandatory deceleration point on the portion of the route that is adjoined or intersected by an other portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, data associated with a mandatory deceleration point on a portion of the route containing a turn, and/or a combination thereof; and wherein the data associated with a non-mandatory deceleration point include one of the following: data associated with a non-mandatory deceleration point on a portion of the route containing an incline, data associated with a non-mandatory deceleration point on a portion of the route containing a visual obstruction, and/or a combination thereof.

BRIEF DESCRIPTION OF THE DRAWINGS

Exemplary embodiments of the present invention are described in further detail below with references made to the attached drawings, included herein by reference.

DETAILED DESCRIPTION OF THE INVENTION

Figure 1:
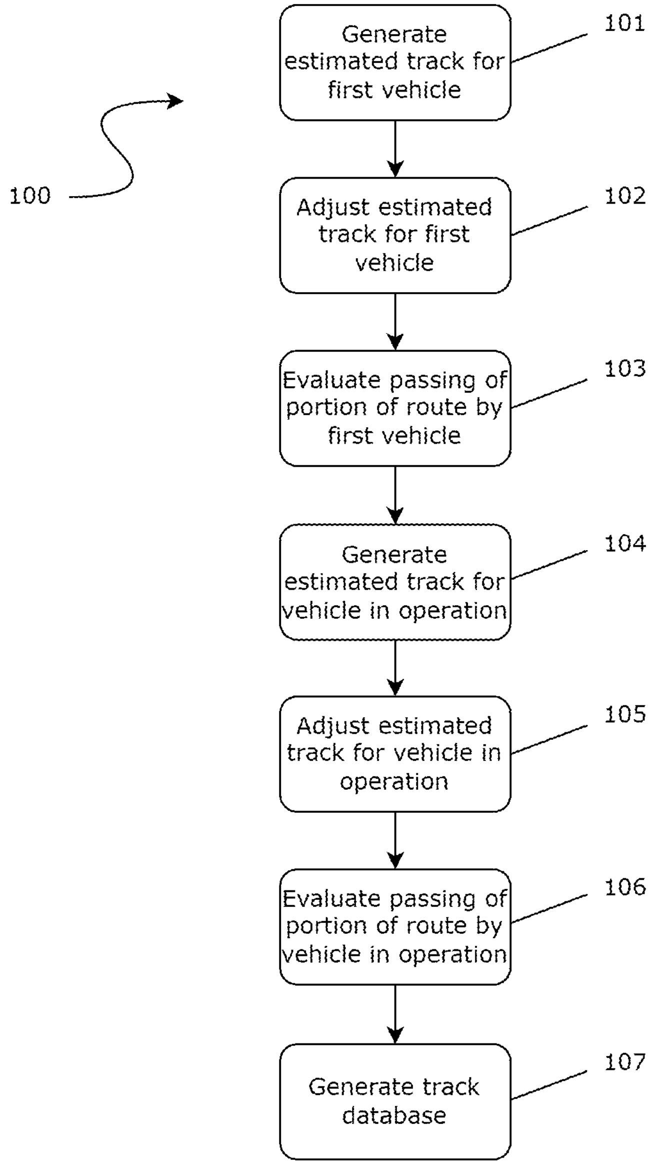
FIG. 1 illustrates an exemplary, non-limiting, diagram for the method 100 for generating an energy-efficient track for the motor vehicle.

According to a preferred embodiment of the present invention, there is provided a method for generating a recuperation energy-efficient track for the vehicle in operation equipped with a braking electric recuperation system moving along a portion of the route that includes a possible deceleration point, that is performed by the computer's CPU, the method comprising at least the following steps: collecting primary data, which involves obtaining data associated with the first motor vehicle equipped with the braking electric recuperation system; data associated with the portion of the route to be passed by the first motor vehicle, and data associated with the second motor vehicle, wherein the second motor vehicle is also the vehicle in operation and passes the portion of the route after the first motor vehicle, and wherein the data associated with the portion of the route include at least data associated with a possible deceleration point; collecting secondary data, which involves generating a track for the first motor vehicle, wherein said track is generated based on how the first motor vehicle passed the portion of the route, and wherein the electric recuperation system is activated when the first motor vehicle is braking while moving along a portion of the route and passing the possible deceleration point; generating an estimated track for the second motor vehicle, wherein said estimated track is generated based on the track generated for the first motor vehicle; wherein the track for the first motor vehicle is generated by performing the following steps: generating a speed profile of the first motor vehicle on the passed portion of the route, and evaluating energy efficiency of the first motor vehicle on the passed portion of the route; wherein energy efficiency of the first motor vehicle on the passed portion of the route is evaluated on the basis of efficiency of the braking electric recuperation system of the first motor vehicle; wherein the data associated with a possible deceleration point include one of the following: data associated with a mandatory deceleration point, data associated with a non-mandatory deceleration point, and/or a combination thereof; wherein the data associated with a mandatory deceleration point include one of the following: data associated with a mandatory deceleration point on the portion of the route that is adjoined or intersected by an other portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, data associated with a mandatory deceleration point on a portion of the route containing a turn, and/or a combination thereof; and wherein the data associated with a non-mandatory deceleration point include one of the following: data associated with a non-mandatory deceleration point on a portion of the route containing an incline, data associated with a non-mandatory deceleration point on a portion of the route containing a visual obstruction, and/or a combination thereof.

In an alternative embodiment of the present invention, there is provided the method characterized in that the data associated with the first and/or second motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, or a combination thereof; wherein the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

In an alternative embodiment of the present invention, there is provided the method characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to cross said another portion of the road without stopping, when the first motor vehicle reaches the mandatory deceleration point, an estimated track for the first motor vehicle is generated, wherein the time that the first motor vehicle requires to pass said another portion of the road moving from the mandatory deceleration point to the end point of passing said another portion of the road is also calculated, and wherein the end point of passing said another portion of the road is not located on said another portion of the road and is located along the direction of movement of the first motor vehicle and along the trajectory that intersects said another portion of the road; and, based on the time calculation, an estimated speed profile of the first motor vehicle for the estimated track for the first motor vehicle is generated, wherein the estimated speed profile contains at least the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the road.

In an alternative embodiment of the present invention, there is provided the method characterized in that the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof.

In an alternative embodiment of the present invention, there is provided the method characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is not allowed to cross said another portion of the road without stopping, when the first motor vehicle reaches the mandatory deceleration point, an estimated track for the first motor vehicle is generated, wherein the time when the traffic control means would again signal that it is allowed to intersect said another portion of the road without stopping is also calculated; and, based on the time calculation, the mandatory deceleration point is relocated so as to allow the first motor vehicle to move along the trajectory that intersects said another portion of the route without stopping, when the traffic control means signals that it is allowed to cross said another portion of the road without stopping.

In an alternative embodiment of the present invention, there is provided the method characterized in that the data associated with the portion of the route include at least data associated with several mandatory deceleration points, wherein the data associated with mandatory deceleration points are data associated with mandatory deceleration points on the portion of the route that are located, respectively, before other portions of the route intersecting said portion of the route, wherein the data obtained from traffic control means are associated with each respective other portion of the route, and wherein the steps of the aforementioned method are performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

In an alternative embodiment of the present invention, there is provided the method characterized in that in case the data associated with the portion of the route to be passed by the first motor vehicle further include at least data associated with a motor vehicle located on said another portion of the route, a track for the motor vehicle located on said another portion of the route is generated, wherein said track contains at least data associated with said another portion of the route that motor vehicle is moving along, wherein the data associated with said another portion of the route include data associated with the trajectory of the motor vehicle moving along said another portion of the route, wherein the data associated with the portion of the route to be passed by the first motor vehicle further include data associated with the trajectory of the first motor vehicle, and wherein said trajectory data include data associated with an intersection between the first motor vehicle's trajectory and that of the motor vehicle moving along said another portion of the route, the mandatory deceleration point is relocated so as to prevent the first motor vehicle and the motor vehicle moving along said another portion of the route from reaching said intersection at the same time, while also enabling the first motor vehicle to move along its trajectory without stopping.

In an alternative embodiment of the claimed invention, there is provided the method, characterized in that in case the data associated with the portion of the route to be passed by the first motor vehicle further include at least data associated with a motor vehicle on the portion of the route at the mandatory deceleration point or in its vicinity, a track for that motor vehicle is generated, and the mandatory deceleration point is relocated so as to generate an estimated track for the first motor vehicle that would correspond to the estimated track for the motor vehicle on the portion of the route at the mandatory deceleration point or in its vicinity, wherein the first motor vehicle is moving along the portion of the route at a lesser speed than the motor vehicle on the portion of the route at the mandatory deceleration point or in its vicinity.

In an alternative embodiment of the present invention, there is provided the method characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

In an alternative embodiment of the present invention, there is provided the method characterized in that the possible deceleration point on the portion of the route is located in accordance with the data associated with the first motor vehicle.

According to another preferred embodiment of the present invention, there is provided a computer-readable medium that stores the program code that, when implemented by the CPU of the computer device, induces the CPU to perform the steps according to any of the methods for generating a recuperation energy-efficient track for the vehicle in operation equipped with a braking electric recuperation system moving along a portion of the route that contains a possible deceleration point.

According to one another preferred embodiment of the present invention, there is provided a system for generating a recuperation energy-efficient track for the vehicle in operation equipped with a braking electric recuperation system moving along a portion of the route that includes a possible deceleration point, the system comprising at least a server comprising at least a CPU and a memory that stores the program code that, when implemented, induces the server's CPU to perform the steps according to the method for generating a recuperation energy-efficient track for the vehicle in operation equipped with a braking electric recuperation system moving along a portion of the route that includes a possible deceleration point, the method comprising at least the following steps: collecting primary data, which involves obtaining data associated with the first motor vehicle equipped with the braking electric recuperation system; data associated with the portion of the route to be passed by the first motor vehicle, and data associated with the second motor vehicle, wherein the second motor vehicle is also the vehicle in operation and passes the portion of the route after the first motor vehicle, and wherein the data associated with the portion of the route include at least data associated with a possible deceleration point; collecting secondary data, which involves generating a track for the first motor vehicle, wherein said track is generated based on how the first motor vehicle passed the portion of the route, and wherein the electric recuperation system is activated when the first motor vehicle is braking while moving along a portion of the route and passing the possible deceleration point; generating an estimated track for the second motor vehicle, wherein said estimated track is generated based on the track generated for the first motor vehicle; wherein the track for the first motor vehicle is generated by performing the following steps: generating a speed profile of the first motor vehicle on the passed portion of the route, and evaluating energy efficiency of the first motor vehicle on the passed portion of the route, wherein energy efficiency of the first motor vehicle on the passed portion of the route is evaluated on the basis of efficiency of the braking electric recuperation system of the first motor vehicle; wherein the data associated with a possible deceleration point include one of the following: data associated with a mandatory deceleration point, data associated with a non-mandatory deceleration point, and/or a combination thereof; wherein the data associated with a mandatory deceleration point include one of the following: data associated with a mandatory deceleration point on a portion of the route that is adjoined or intersected by an other portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, data associated with a mandatory deceleration point on a portion of the route containing a turn, and/or a combination thereof; and wherein the data associated with a non-mandatory deceleration point include one of the following: data associated with a non-mandatory deceleration point on a portion of the route containing an incline, data associated with a non-mandatory deceleration point on a portion of the route containing a visual obstruction, and/or a combination thereof; and the system further comprising at least a vehicle in operation comprising at least a driving device and an engine that is connected to and actuates the driving device, and a motion control system of the vehicle in operation that is adapted to control the engine of the vehicle in operation equipped with a braking electric recuperation system, wherein the motion control system of the vehicle in operation is connected to the server and comprises at least a transceiver adapted at least to receive the estimated track for the second motor vehicle.

In an alternative embodiment of the present invention, there is provided the system characterized in that the data associated with the first and/or second motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, or a combination thereof; wherein the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

In an alternative embodiment of the present invention, there is provided the system characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to cross said another portion of the road without stopping, when the first motor vehicle reaches the mandatory deceleration point, an estimated track for the first motor vehicle is generated, wherein the time that the first motor vehicle requires to pass said another portion of the road moving from the mandatory deceleration point to the end point of passing said another portion of the road is also calculated, and wherein the end point of passing said another portion of the road is not located on said another portion of the road and is located along the direction of movement of the first motor vehicle and along the trajectory that intersects said another portion of the road; and, based on the time calculation, an estimated speed profile of the first motor vehicle for the estimated track for the first motor vehicle is generated, wherein the estimated speed profile contains at least the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the road.

In an alternative embodiment of the present invention, there is provided the system characterized in that the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof.

In an alternative embodiment of the present invention, there is provided the system characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is not allowed to cross said another portion of the road without stopping, when the first motor vehicle reaches the mandatory deceleration point, an estimated track for the first motor vehicle is generated, wherein the time when the traffic control means would again signal that it is allowed to intersect said another portion of the road without stopping is also calculated; and, based on the time calculation, the mandatory deceleration point is relocated so as to allow the first motor vehicle to move along the trajectory that intersects said another portion of the route without stopping, when the traffic control means signals that it is allowed to cross said another portion of the road without stopping.

In an alternative embodiment of the present invention, there is provided the system characterized in that the data associated with the portion of the route include at least data associated with several mandatory deceleration points, wherein the data associated with mandatory deceleration points are data associated with mandatory deceleration points on the portion of the route that are located, respectively, before other portions of the route intersecting said portion of the route, wherein the data obtained from traffic control means are associated with each respective other portion of the route, and wherein the steps of the aforementioned method are performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

In an alternative embodiment of the present invention, there is provided the system characterized in that in case the data associated with the portion of the route to be passed by the first motor vehicle further include at least data associated with a motor vehicle located on said another portion of the route, a track for the motor vehicle located on said another portion of the route is generated, wherein said track contains at least data associated with said another portion of the route that motor vehicle is moving along, wherein the data associated with said another portion of the route include data associated with the trajectory of the motor vehicle moving along said another portion of the route, wherein the data associated with the portion of the route to be passed by the first motor vehicle further include data associated with the trajectory of the first motor vehicle, and wherein said trajectory data include data associated with an intersection between the first motor vehicle's trajectory and that of the motor vehicle moving along said another portion of the route, the mandatory deceleration point is relocated so as to prevent the first motor vehicle and the motor vehicle moving along said another portion of the route from reaching said intersection at the same time, while also enabling the first motor vehicle to move along its trajectory without stopping.

In an alternative embodiment of the claimed invention, there is provided the system, characterized in that in case the data associated with the portion of the route to be passed by the first motor vehicle further include at least data associated with a motor vehicle on the portion of the route at the mandatory deceleration point or in its vicinity, a track for that motor vehicle is generated, and the mandatory deceleration point is relocated so as to generate an estimated track for the first motor vehicle that would correspond to the estimated track for the motor vehicle on the portion of the route at the mandatory deceleration point or in its vicinity, wherein the first motor vehicle is moving along the portion of the route at a lesser speed than the motor vehicle on the portion of the route at the mandatory deceleration point or in its vicinity.

In an alternative embodiment of the present invention, there is provided the system characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof;

wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

In an alternative embodiment of the present invention, there is provided the system characterized in that the possible deceleration point on the portion of the route is located in accordance with the data associated with the first motor vehicle.

In an alternative embodiment of the present invention, there is provided the system, characterized in that the step of collecting primary data further involves collecting data associated with the portion of the route, along which the second motor vehicle is moving, wherein the data include at least one of the following: the geometry of the portion of the route, the route grade of the portion of the route, the allowed speed on the portion of the route, the quality of route surface of the portion of the route, speed limits on the portion of the route, turns on the portion of the route, weather conditions on the portion of the route, or its infrastructure, and/or a combination thereof.

In an alternative embodiment of the present invention, there is provided the system characterized in that the track for the first motor vehicle is generated by performing the following additional steps: refining the primary data associated with the first motor vehicle based on how it passed the portion of the route; refining the primary data associated with the portion of the route based on how it was passed by the first motor vehicle; wherein the refining of the primary data associated with the portion of the route is also based on the data obtained from the environmental sensors of the first motor vehicle.

In an alternative embodiment of the present invention, there is provided the system, characterized in that the primary data associated with the first motor vehicle and the primary data associated with the portion of the route form an estimated track for the first motor vehicle, wherein such estimated track further contains an estimated speed profile of the first motor vehicle.

In an alternative embodiment of the present invention, there is provided the system, characterized in that the estimated track for the first motor vehicle further contains data associated with an estimated acceleration point on the portion of the route, wherein the data associated with the mandatory deceleration point are estimated data associated with the mandatory deceleration point.

In an alternative embodiment of the present invention, there is provided the system, characterized in that the track generated for the first motor vehicle further contains data associated with the actual acceleration point and/or data associated with the actual mandatory deceleration point determined based on how the first motor vehicle passed the given portion of the route.

In an alternative embodiment of the present invention, there is provided the system, characterized in that the track generated for the first motor vehicle further contains the data on mismatches between the data associated with the actual acceleration point and/or data associated with the actual deceleration point and respective data associated with an estimated acceleration point and/or data associated with an estimated deceleration point.

In an alternative embodiment of the present invention, there is provided the system, characterized in that the step of generating a track for the first motor vehicle further comprises a step of obtaining actual data on energy consumption by the first motor vehicle on the portion of the route.

In an alternative embodiment of the present invention, there is provided the system characterized in that the step of evaluating the energy efficiency of how the first motor vehicle passed the portion of the route involves comparing the estimated data on energy consumption by the first motor vehicle on the portion of the route with the actual data on energy consumption by the first motor vehicle on the portion of the route.

In an alternative embodiment of the present invention, there is provided the system characterized in that the estimated data on energy consumption by the first motor vehicle on the portion of the route are compared with the actual data on energy consumption by the first motor vehicle on the portion of the route taking into account the speed profile generated for the first motor vehicle.

In an alternative embodiment of the present invention, there is provided the system, characterized in that when the first motor vehicle is passing through the portion of the route, its actual speed profile is determined in at least one moment in time, and in case the actual speed profile of the first motor vehicle deviates from its estimated speed profile, an energy consumption control signal is generated for the first motor vehicle, wherein the energy consumption control signal for the first motor vehicle is a signal for the motion control system of the first motor vehicle and/or the on-board information system of the first motor vehicle and is a signal to decrease or increase the wheel speed of at least one wheel of the first motor vehicle.

According to one another preferred embodiment of the present invention, there is provided a computer device for generating a recuperation energy-efficient track for the vehicle in operation equipped with a braking electric recuperation system moving along a portion of the route that includes a possible deceleration point, the device comprising at least a CPU and a memory that stores the program code that, when implemented, induces the CPU to perform the steps according to the method for generating a recuperation energy-efficient track for the vehicle in operation equipped with a braking electric recuperation system moving along a portion of the route that includes a possible deceleration point, the method comprising at least the following steps: collecting primary data, which involves obtaining data associated with the first motor vehicle equipped with the braking electric recuperation system; data associated with the portion of the route to be passed by the first motor vehicle, and data associated with the second motor vehicle, wherein the second motor vehicle is also the vehicle in operation and passes the portion of the route after the first motor vehicle, and wherein the data associated with the portion of the route include at least data associated with a possible deceleration point; collecting secondary data, which involves generating a track for the first motor vehicle, wherein said track is generated based on how the first motor vehicle passed the portion of the route, and wherein the electric recuperation system is activated when the first motor vehicle is braking while moving along a portion of the route and passing the possible deceleration point; generating an estimated track for the second motor vehicle, wherein said estimated track is generated based on the track generated for the first motor vehicle; wherein the track for the first motor vehicle is generated by performing the following steps: generating a speed profile of the first motor vehicle on the passed portion of the route, and evaluating energy efficiency of the first motor vehicle on the passed portion of the route; wherein energy efficiency of the first motor vehicle on the passed portion of the route is evaluated on the basis of efficiency of the braking electric recuperation system of the first motor vehicle; wherein the data associated with a possible deceleration point include one of the following: data associated with a mandatory deceleration point, data associated with a non-mandatory deceleration point, and/or a combination thereof; wherein the data associated with a mandatory deceleration point include one of the following: data associated with a mandatory deceleration point on the portion of the route that is adjoined or intersected by an other portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, data associated with a mandatory deceleration point on a portion of the route containing a turn, and/or a combination thereof; and wherein the data associated with a non-mandatory deceleration point include one of the following: data associated with a non-mandatory deceleration point on a portion of the route containing an incline, data associated with a non-mandatory deceleration point on a portion of the route containing a visual obstruction, and/or a combination thereof.

In an alternative embodiment of the present invention, there is provided a device characterized in that the data associated with the first and/or second motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, or a combination thereof; wherein the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

In an alternative embodiment of the present invention, there is provided the device characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

In an alternative embodiment of the present invention, there is provided the device characterized in that the possible deceleration point on the portion of the route is located in accordance with the data associated with the first motor vehicle.

In an alternative embodiment, there is provided the device, characterized in that the step of collecting primary data further involves collecting data associated with the portion of the route, along which the second motor vehicle is moving, wherein the data include at least one of the following: the geometry of the portion of the route, the route grade of the portion of the route, the allowed speed on the portion of the route, the quality of route surface of the portion of the route, speed limits on the portion of the route, turns on the portion of the route, weather conditions on the portion of the route, or its infrastructure, and/or a combination thereof.

In an alternative embodiment of the present invention, there is provided the device characterized in that the track for the first motor vehicle is generated by performing the following additional steps: refining the primary data associated with the first motor vehicle based on how it passed the portion of the route; refining the primary data associated with the portion of the route based on how it was passed by the first motor vehicle; wherein the refining of the primary data associated with the portion of the route is also based on the data obtained from the environmental sensors of the first motor vehicle.

In an alternative embodiment of the present invention, there is provided the device characterized in that the primary data associated with the first motor vehicle and the primary data associated with the portion of the route form an estimated track for the first motor vehicle, wherein such estimated track further contains an estimated speed profile of the first motor vehicle.

In an alternative embodiment, there is provided the device, characterized in that the estimated track for the first motor vehicle further contains data associated with an estimated acceleration point on the portion of the route, wherein the data associated with the mandatory deceleration point are estimated data associated with the mandatory deceleration point.

In an alternative embodiment, there is provided the device, characterized in that the track generated for the first motor vehicle further contains data associated with the actual acceleration point and/or data associated with the actual mandatory deceleration point determined based on how the first motor vehicle passed the given portion of the route.

In an alternative embodiment, there is provided the device, characterized in that the track generated for the first motor vehicle further contains the data on mismatches between the data associated with the actual acceleration point and/or data associated with the actual mandatory deceleration point and respective data associated with an estimated acceleration point and/or data associated with an estimated mandatory deceleration point.

In an alternative embodiment, there is provided the device, characterized in that the step of generating a track for the first motor vehicle further comprises a step of obtaining actual data on energy consumption by the first motor vehicle on the portion of the route.

In an alternative embodiment of the present invention, there is provided the device characterized in that the step of evaluating the energy efficiency of how the first motor vehicle passed the portion of the route involves comparing the estimated data on energy consumption by the first motor vehicle on the portion of the route with the actual data on energy consumption by the first motor vehicle on the portion of the route.

In an alternative embodiment of the present invention, there is provided the device characterized in that the estimated data on energy consumption by the first motor vehicle on the portion of the route are compared with the actual data on energy consumption by the first motor vehicle on the portion of the route taking into account the speed profile generated for the first motor vehicle.

In an alternative embodiment, there is provided the device, characterized in that when the first motor vehicle is passing through the portion of the route, its actual speed profile is determined in at least one moment in time, and in case the actual speed profile of the first motor vehicle deviates from its estimated speed profile, an energy consumption control signal is generated for the first motor vehicle, wherein the energy consumption control signal for the first motor vehicle is a signal for the motion control system of the first motor vehicle and/or the on-board information system of the first motor vehicle and is a signal to decrease or increase the wheel speed of at least one wheel of the first motor vehicle.

According to one another preferred embodiment of the present invention, there is provided a motor vehicle comprising at least a driving device and an engine that is connected to and actuates the driving device, and a motion control system of the vehicle in operation that is adapted to control the engine of the vehicle in operation equipped with a braking electric recuperation system, and the motion control system further comprising at least a computer device for generating a recuperation energy-efficient track for the vehicle in operation equipped with a braking electric recuperation system moving along a portion of the route that includes a possible deceleration point, the device comprising at least a CPU and a memory that stores the program code that, when implemented, induces the CPU to perform the steps according to the method for generating a recuperation energy-efficient track for the vehicle in operation equipped with a braking electric recuperation system moving along a portion of the route that includes a possible deceleration point, the method comprising at least the following steps: collecting primary data, which involves obtaining data associated with the first motor vehicle equipped with the braking electric recuperation system; data associated with the portion of the route to be passed by the first motor vehicle, and data associated with the second motor vehicle, wherein the second motor vehicle is also the vehicle in operation and passes the portion of the route after the first motor vehicle, and wherein the data associated with the portion of the route include at least data associated with a possible deceleration point; collecting secondary data, which involves generating a track for the first motor vehicle, wherein said track is generated based on how the first motor vehicle passed the portion of the route, and wherein the electric recuperation system is activated when the first motor vehicle is braking while moving along a portion of the route and passing the possible deceleration point; generating an estimated track for the second motor vehicle, wherein said estimated track is generated based on the track generated for the first motor vehicle; wherein the track for the first motor vehicle is generated by performing the following steps: generating a speed profile of the first motor vehicle on the passed portion of the route, and evaluating energy efficiency of the first motor vehicle on the passed portion of the route; wherein energy efficiency of the first motor vehicle on the passed portion of the route is evaluated on the basis of efficiency of the braking electric recuperation system of the first motor vehicle; wherein the data associated with a possible deceleration point include one of the following: data associated with a mandatory deceleration point, data associated with a non-mandatory deceleration point, and/or a combination thereof; wherein the data associated with a mandatory deceleration point include one of the following: data associated with a mandatory deceleration point on the portion of the route that is adjoined or intersected by an other portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, data associated with a mandatory deceleration point on a portion of the route containing a turn, and/or a combination thereof; and wherein the data associated with a non-mandatory deceleration point include one of the following: data associated with a non-mandatory deceleration point on a portion of the route containing an incline, data associated with a non-mandatory deceleration point on a portion of the route containing a visual obstruction, and/or a combination thereof.

In an alternative embodiment of the present invention, there is provided the vehicle characterized in that the data associated with the first and/or second motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, or a combination thereof; wherein the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

In an alternative embodiment of the present invention, there is provided the vehicle characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to cross said another portion of the road without stopping, when the first motor vehicle reaches the mandatory deceleration point, an estimated track for the first motor vehicle is generated, wherein the time that the first motor vehicle requires to pass said another portion of the road moving from the mandatory deceleration point to the end point of passing said another portion of the road is also calculated, and wherein the end point of passing said another portion of the road is not located on said another portion of the road and is located along the direction of movement of the first motor vehicle and along the trajectory that intersects said another portion of the road; and, based on the time calculation, an estimated speed profile of the first motor vehicle for the estimated track for the first motor vehicle is generated, wherein the estimated speed profile contains at least the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the road.

In an alternative embodiment of the present invention, there is provided the vehicle characterized in that the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof.

In an alternative embodiment of the present invention, there is provided the vehicle characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is not allowed to cross said another portion of the road without stopping, when the first motor vehicle reaches the mandatory deceleration point, an estimated track for the first motor vehicle is generated, wherein the time when the traffic control means would again signal that it is allowed to intersect said another portion of the road without stopping is also calculated; and, based on the time calculation, the mandatory deceleration point is relocated so as to allow the first motor vehicle to move along the trajectory that intersects said another portion of the route without stopping, when the traffic control means signals that it is allowed to cross said another portion of the road without stopping.

In an alternative embodiment of the present invention, there is provided the vehicle characterized in that the data associated with the portion of the route include at least data associated with several mandatory deceleration points, wherein the data associated with mandatory deceleration points are data associated with mandatory deceleration points on the portion of the route that are located, respectively, before other portions of the route intersecting said portion of the route, wherein the data obtained from traffic control means are associated with each respective other portion of the route, and wherein the steps of the aforementioned method are performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

In an alternative embodiment of the present invention, there is provided the vehicle characterized in that in case the data associated with the portion of the route to be passed by the first motor vehicle further include at least data associated with a motor vehicle located on said another portion of the route, a track for the motor vehicle located on said another portion of the route is generated, wherein said track contains at least data associated with said another portion of the route that motor vehicle is moving along, wherein the data associated with said another portion of the route include data associated with the trajectory of the motor vehicle moving along said another portion of the route, wherein the data associated with the portion of the route to be passed by the first motor vehicle further include data associated with the trajectory of the first motor vehicle, and wherein said trajectory data include data associated with an intersection between the first motor vehicle's trajectory and that of the motor vehicle moving along said another portion of the route, the mandatory deceleration point is relocated so as to prevent the first motor vehicle and the motor vehicle moving along said another portion of the route from reaching said intersection at the same time, while also enabling the first motor vehicle to move along its trajectory without stopping.

In an alternative embodiment of the claimed invention, there is provided the vehicle, characterized in that in case the data associated with the portion of the route to be passed by the first motor vehicle further include at least data associated with a motor vehicle on the portion of the route at the mandatory deceleration point or in its vicinity, a track for that motor vehicle is generated, and the mandatory deceleration point is relocated so as to generate an estimated track for the first motor vehicle that would correspond to the estimated track for the motor vehicle on the portion of the route at the mandatory deceleration point or in its vicinity, wherein the first motor vehicle is moving along the portion of the route at a lesser speed than the motor vehicle on the portion of the route at the mandatory deceleration point or in its vicinity.

In an alternative embodiment of the present invention, there is provided the vehicle characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include the estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

In an alternative embodiment of the present invention, there is provided the vehicle characterized in that the possible deceleration point on the portion of the route is located in accordance with the data associated with the first motor vehicle.

In an alternative embodiment of the present invention, there is provided the vehicle, characterized in that the step of collecting primary data further involves collecting data associated with the portion of the route, along which the second motor vehicle is moving, wherein the data include at least one of the following: the geometry of the portion of the route, the route grade of the portion of the route, the allowed speed on the portion of the route, the quality of route surface of the portion of the route, speed limits on the portion of the route, turns on the portion of the route, weather conditions on the portion of the route, or its infrastructure, and/or a combination thereof.

In an alternative embodiment of the present invention, there is provided a motor vehicle characterized in that the track for the first motor vehicle is generated by performing the following additional steps: refining the primary data associated with the first motor vehicle based on how it passed the portion of the route; refining the primary data associated with the portion of the route based on how it was passed by the first motor vehicle; wherein the refining of the primary data associated with the portion of the route is also based on the data obtained from the environmental sensors of the first motor vehicle.

In an alternative embodiment of the present invention, there is provided the vehicle, characterized in that the primary data associated with the first motor vehicle and the primary data associated with the portion of the route form an estimated track for the first motor vehicle, wherein such estimated track further contains an estimated speed profile of the first motor vehicle.

In an alternative embodiment of the present invention, there is provided the vehicle, characterized in that the estimated track for the first motor vehicle further contains data associated with an estimated acceleration point on the portion of the route, wherein the data associated with the mandatory deceleration point are estimated data associated with the mandatory deceleration point.

In an alternative embodiment of the present invention, there is provided the vehicle, characterized in that the track generated for the first motor vehicle further contains data associated with the actual acceleration point and/or data associated with the actual mandatory deceleration point determined based on how the first motor vehicle passed the given portion of the route.

In an alternative embodiment of the present invention, there is provided the vehicle, characterized in that the track generated for the first motor vehicle further contains the data on mismatches between the data associated with the actual acceleration point and/or data associated with the actual deceleration point and respective data associated with an estimated acceleration point and/or data associated with an estimated deceleration point.

In an alternative embodiment of the present invention, there is provided the vehicle, characterized in that the step of generating a track for the first motor vehicle further comprises a step of obtaining actual data on energy consumption by the first motor vehicle on the portion of the route.

In an alternative embodiment of the present invention, there is provided the vehicle characterized in that the step of evaluating the energy efficiency of how the first motor vehicle passed the portion of the route involves comparing the estimated data on energy consumption by the first motor vehicle on the portion of the route with the actual data on energy consumption by the first motor vehicle on the portion of the route.

In an alternative embodiment of the present invention, there is provided the vehicle characterized in that the estimated data on energy consumption by the first motor vehicle on the portion of the route are compared with the actual data on energy consumption by the first motor vehicle on the portion of the route taking into account the speed profile generated for the first motor vehicle.

In an alternative embodiment of the present invention, there is provided the vehicle, characterized in that when the first motor vehicle is passing through the portion of the route, its actual speed profile is determined in at least one moment in time, and in case the actual speed profile of the first motor vehicle deviates from its estimated speed profile, an energy consumption control signal is generated for the first motor vehicle, wherein the energy consumption control signal for the first motor vehicle is a signal for the motion control system of the first motor vehicle and/or the on-board information system of the first motor vehicle and is a signal to decrease or increase the wheel speed of at least one wheel of the first motor vehicle.

Additional alternative embodiments of the present invention are provided below. This disclosure is in no way limiting to the scope of protection granted by the present patent. Rather, it should be noted that the claimed invention can be implemented in different ways, so as to include different components and conditions, or combinations thereof, which are similar to the components and conditions disclosed herein, in combination with other existing and future technologies.

FIG. 1 illustrates an exemplary, non-limiting, diagram for the method 100 for generating an energy-efficient track for the motor vehicle. Preferably, but not limited to, the method 100 comprises the following steps: an optional step 101 of forming an estimated track for the first motor vehicle; an optional step 102 of adjusting the estimated track for the first motor vehicle; a step 103 of evaluating the passing of a portion of the route by the first motor vehicle; a step 104 of forming an estimated track for the vehicle in operation (second motor vehicle); an optional step 105 of adjusting the estimated track for the vehicle in operation (second motor vehicle); an optional step 106 of evaluating the passing of a portion of the route by the vehicle in operation (second motor vehicle); an optional step 107 of generating a track database. Preferably, but not limited to, the motor vehicle is any conventional motor vehicle, such as, but not limited to, a wheeled vehicle or a tracked vehicle, wherein the vehicle has to comprise at least one engine that consumes energy to actuate at least one moving device of the vehicle, such as, but not limited to, the wheels. The energy consumed by the engine is, for example, but not limited to, the energy produced by burning a fuel (in case the motor vehicle is equipped with an internal combustion engine), by electricity (in case the motor vehicle is equipped with an electric motor), or by a combination thereof (in case the motor vehicle is a hybrid vehicle). The first motor vehicle is a motor vehicle that passes the portion of the route first. The second motor vehicle is a motor vehicle that passes the portion of the route after the first motor vehicle. The vehicle in operation is, preferably, but not limited to, the aforementioned second motor vehicle that will pass the portion of the route after the first motor vehicle, or, but not limited to, any other motor vehicle that will pass the portion of the route after the second motor vehicle, that is, after the first motor vehicle as well. While some of the methods disclosed below are intended to be implemented as part of the motion control system of the vehicle in operation (second motor vehicle), or in connection thereto, it should be obvious to a person having ordinary skill in the art that the disclosed methods may also be implemented as part of systems or devices that are not connected to the vehicle in operation (second motor vehicle) or are indirectly connected to it, as well as in computer simulations. Preferably, but not limited to, the motor vehicles are controlled via a corresponding motor vehicle control system (a motor vehicle's control system) that comprises a set of interconnected units and components configured so that the motor vehicle can be controlled by an operator, i.e. a driver, an autonomous control system, a remote user, or a remote control system, in order to drive the motor vehicle, to stop its movement, to change the direction of its movement, to change its speed, etc. Motor vehicle control systems are widely known, and therefore are not described any further, however, preferably, but not limited to, the claimed motor vehicle control system has to comprise a speed control element of the motor vehicle, the component being one of the following or any suitable combination thereof: an accelerator pedal of the vehicle in operation (second motor vehicle), a brake pedal of the vehicle in operation (second motor vehicle), a retarder of the vehicle in operation (second motor vehicle), an intarder of the vehicle in operation (second motor vehicle), a compression brake of the vehicle in operation (second motor vehicle), a decompression brake of the vehicle in operation (second motor vehicle), or a gearbox of the vehicle in operation (second motor vehicle). Preferably, but not limited to, these elements, as well as other components of the motion control system should be equipped with a variety of sensors (such as, but not limited to, contact and contactless position sensors, encoders, induction sensors, magnetoresistive sensors, volumetric flow meters, capacitive sensors, oxygen sensors, nitrogen oxide sensors, temperature sensors, pressure sensors, knock sensors, oil level sensors, light level sensors, rain sensors, as well as various environmental sensors, such as, but not limited to, radars, lidars, cameras, global positioning sensors, odometry sensors, gyrostabilizers) allowing to read the state of each component at any given moment in time, to locate the motor vehicle at any given moment in time, and to read its technical status and other parameters at any given moment in time. Preferably, but not limited to, the sensors have to be adapted to digital data output. These sensors, as well as the methods for obtaining useful information from them, are widely known in the art, and therefore are not described in further detail. Preferably, but not limited to, the motion control system further comprises any kind of a braking electric recuperation system that can be used to replenish electric energy accumulated and spent by the systems in the motor vehicle. Such braking electric recuperation systems are widely known in the art (see e.g., patents U.S. Pat. No. 7,739,005B1 and U.S. Pat. No. 8,453,770B2 included herein by reference) and therefore are not described in further detail. Preferably, but not limited to, the motor vehicle control system further comprises any kind of electronic devices capable of computation, such as a vehicle dashboard; a device for projecting visual information onto the windshield of the motor vehicle; a device for projecting visual information onto a head-up display (HUD); a head unit; a user device, also a wearable user device, for receiving and transmitting data (e.g. a transceiver), and for producing a GUI (e.g. a dashboard display); a display of the device for projecting visual information onto the windshield of the motor vehicle; a HUD of the device for projecting visual information onto a head-up display (HUD); a display of the head unit; a display of the user device, also a HUD of the wearable user device; a device for producing audio signals (e.g. speakers). Preferably, but not limited to, the electronic devices capable of computation comprise at least a CPU and a memory that stores the program code that, when implemented, induces the CPU to perform the steps according to some method performed by the CPU. For example, but not limited to, the CPU and memory may be the main CPU and memory of the motor vehicle control system implemented as a central controller. Preferably, but not limited to, the vehicle dashboard comprises the aforementioned CPU and memory, and/or communicates with the aforementioned central controller. Preferably, but not limited to, the device for projecting visual information onto the windshield of the motor vehicle comprises the aforementioned CPU and memory, and/or communicates with the aforementioned central controller. Preferably, but not limited to, the device for projecting visual information onto a HUD comprises the aforementioned CPU and memory, and/or communicates with the aforementioned central controller. Preferably, but not limited to, the head unit of the motor vehicle comprises the aforementioned CPU and memory, and/or communicates with the aforementioned central controller. Preferably, but not limited to, the user device communicates with the motor vehicle control system via conventional data exchange protocols and comprises the aforementioned CPU and memory, and/or communicates with the aforementioned central controller via conventional data exchange protocols. For example, but not limited to, the user device may be represented by a smartphone, a PDA, a tablet, a netbook, a laptop, etc. For example, but not limited to, the user device may be represented by a wearable user device, such as, for instance, a wearable display device as disclosed by the patent U.S. Pat. No. 10,176,783B2 or a similar one. When the user device is a wearable user device, it should be preferably, but not limited to, equipped by a HUD capable of displaying visual information. Preferably, but not limited to, the aforementioned dashboard, head unit, and the device for projecting visual information onto the windshield of the motor vehicle should comprise a corresponding display capable of visual information output, or be somehow connected to such display. Preferably, but not limited to, the aforementioned device for projecting visual information onto a HUD should comprise a corresponding HUD capable of visual information output, or be somehow connected to such display. Preferably, but not limited to, the computer devices mentioned in the present disclosure are generally any suitable computer devices that comprise at least a CPU and a memory, particularly, but not limited to, the claimed electronic devices capable of computation, the user device and the server of the system for generating an energy-efficient track for the vehicle in operation (second motor vehicle). Preferably, but not limited to, the control system of the motor vehicle may be connected via a transceiver with the user device, the server of the system for generating the energy-efficient track, other servers and control systems of other motor vehicles, but not limited to. Preferably, but not limited to, the generated estimated and/or energy-efficient tracks for each motor vehicle can be used to generate a control signal to control the movement of the corresponding motor vehicle, and/or used to generate an information signal to inform a human operator that it is necessary to change the movement of the corresponding motor vehicle.

Preferably, but not limited to, the portion of the route is a portion of the route with special properties. A route is, but not limited to, a strip of land adapted to be passable by motor vehicles, wherein the route may comprise, but not limited to, a road, a junction, an intersection, etc. A road may be, but not limited to, a paved road or a dirt road. Preferably, but not limited to, the special properties of the portion of the route may comprise at least one of the following: the geometry of the portion of the route, the road grade of the portion of the route, the allowed speed on the portion of the route, the quality of road surface of the portion of the route, speed limits on the portion of the route, turns on the portion of the route, weather conditions on the portion of the route at the moment it is passed by a motor vehicle, the infrastructure of the portion of the road, or a combination thereof. For example, but not limited to, the special properties of the portion of the route may be described through acceleration points and/or deceleration points, including estimated acceleration points and/or estimated deceleration points. In addition, but not limited to, as will be shown below, estimated tracks for motor vehicles may contain data associated with estimated acceleration points and/or estimated deceleration points, and also, but not limited to, as will be shown below, generated tracks for motor vehicles may contain data associated with actual acceleration points and/or actual deceleration points, wherein, but not limited to, such data may be analyzed and processed in order to find deviations between estimated and actual data, if any, to determine how they impact energy efficiency of a motor vehicle's movement. In addition, but not limited to, a deceleration point may be a point on the portion of the route, in which the momentum of the motor vehicle is sufficient to cover the distance to an acceleration point on the portion of the route. In addition, but not limited to, a deceleration point may be a point on the portion of the route, in which the motor vehicle has to be given negative or zero acceleration in order to smoothly reach the acceleration point, wherein the negative acceleration may be such that the motor vehicle has zero momentum at the acceleration point. In addition, but not limited to, an acceleration point may be a point on the portion of the route, in which the motor vehicle continues to move with negative acceleration. In addition, but not limited to, an acceleration point may be a point on the portion of the route, in which the motor vehicle has zero momentum. For example, but not limited to, a portion of the route may comprise a road with a slope and an upslope that follows it, wherein the beginning of the slope may be marked by a deceleration point, and an acceleration point may be placed within the upslope.

Figure 2:
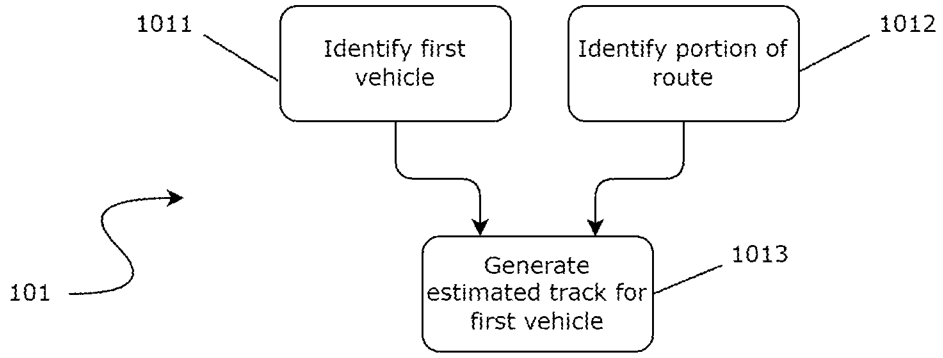
FIG. 2 illustrates an exemplary, non-limiting, diagram for the step 101 of generating an estimated track for the first motor vehicle.

As shown in FIG. 2, the optional step 101 of generating an estimated track for the first motor vehicle, for example, but not limited to, comprises the following steps: a step 1011 of identifying the first motor vehicle; a step 1012 of identifying the portion of the route; and a step 1013 of generating an estimated track for the first motor vehicle. For example, but not limited to, the step 1011 involves determining the first motor vehicle and the data associated with it. Such data may include, for example, but not limited to, at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, and/or a combination thereof. In general, it should be noted that such data may be used to generate an estimated speed profile of the first motor vehicle on a given portion of the route. The step 1011 further involves determining the location of the first motor vehicle relative to the portion of the route that is identified in the step 1012. In addition, for example, but not limited to, the step 1012 involves determining the first portion of the route along the direction of movement of the first motor vehicle, relative to its location. The step 1012 further involves determining the special properties of the portion of the route, which are data associated with the portion of the route to be passed by the first motor vehicle. In general, it should be noted that the data about the special properties of the portion of the route may be used to generate an estimated speed profile of the first motor vehicle on this portion of the route. In addition, for example, but not limited to, the step 1013 involves generating an estimated track for the first motor vehicle on the portion of the route using the data associated with the first motor vehicle and the data associated with the portion of the route to be passed by the first motor vehicle. Therefore, the generated estimated track for the first motor vehicle contains both the data associated with the first motor vehicle and the data associated with the portion of the route to be passed by the first motor vehicle. Preferably, but not limited to, the generated estimated track for the first motor vehicle further contains the estimated speed profile of the first motor vehicle, which, in turn, contains at least estimated locations of the first motor vehicle on the portion of the route and estimated speeds of the first motor vehicle on the portion of the route associated with said estimated locations. The estimated speed profile of the first motor vehicle further contains, but not limited to, estimated states of the speed control element of the first motor vehicle, which is one of the following: the accelerator pedal of the first motor vehicle, its brake pedal, its retarder, its intarder, its compression brake, decompression brake, its gearbox, or a combination thereof; wherein the state of the speed control element, according to the present disclosure, comprises the positions of the moving parts of the corresponding control element in its active state, i.e. relative to the state, in which the corresponding element is not activated, and/or any other active state of the element, and/or any other non-active state of the element; and wherein the estimated states of the control element are also associated with the corresponding estimated location of the motor vehicle on the portion of the route. Subsequently, the first motor vehicle moves along the given portion of the route in accordance with the estimated track for the first motor vehicle, wherein it is assumed that the estimated track is energy efficient. A motor vehicle track can be considered energy efficient in case both the time spent by the motor vehicle to pass the portion of the route and the energy consumed by the motor vehicle to pass the portion of the route are minimal. However, it should be obvious to a person having ordinary skill in the art that the estimated track for the first motor vehicle, generated in step 101, may be also generated using alternative ways.

Figure 3:
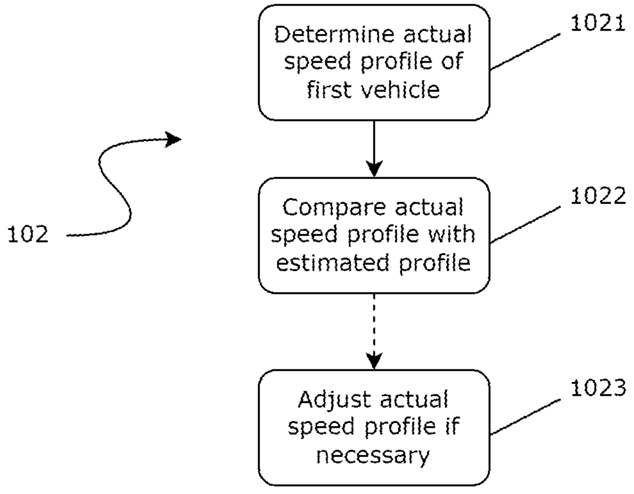
FIG. 3 illustrates an exemplary, non-limiting, diagram for the step 102 of adjusting the estimated track for the first motor vehicle.

As shown in FIG. 3, the optional step 102 of adjusting the estimated track for the first motor vehicle, for example, but not limited to, comprises the following steps: a step 1021 of determining the actual speed profile of the first motor vehicle in at least one of the moments when it passes the portion of the route; a step 1022 of comparing the actual speed profile with the corresponding estimated speed profile from the estimated track for the first motor vehicle; and, if necessary, a step 1023 of adjusting the actual speed profile in response to the results of said comparison. For example, but not limited to, the step 1021 involves determining the location of the first motor vehicle on the portion of the route, together with at least a single wheel speed of the first motor vehicle in the specified moment in time. In addition, for example, but not limited to, the step 1022 involves determining the estimated wheel speed of at least a single wheel of the first motor vehicle in the specified moment in time, as well as matching the actual wheel speed and the estimated wheel speed. In addition, for example, but not limited to, in case the actual wheel speed differs from the estimated wheel speed, an energy consumption control signal is generated for the first motor vehicle in step 1023. This energy consumption control signal, for example, but not limited to, contains a control signal for the motion control system of the first motor vehicle, which changes the operation of the engine, and/or the brake system, and/or other technical components of the first motor vehicle, so that the actual wheel speed matches the estimated wheel speed in the specified moment in time. However, it should be obvious to a person having ordinary skill in the art that although the adjustment of the estimated track for the first motor vehicle enhances the accuracy of the subsequent generation of the energy-efficient track for the vehicle in operation (second motor vehicle) thus allowing to reduce energy consumption by the vehicle in operation (second motor vehicle) on a specific portion of the route, said adjustment is optional, since the actual track of the first motor vehicle, which is generated according to the method described below, may be sufficient for generating an accurate energy-efficient track for the vehicle in operation (second motor vehicle).

Figure 4:
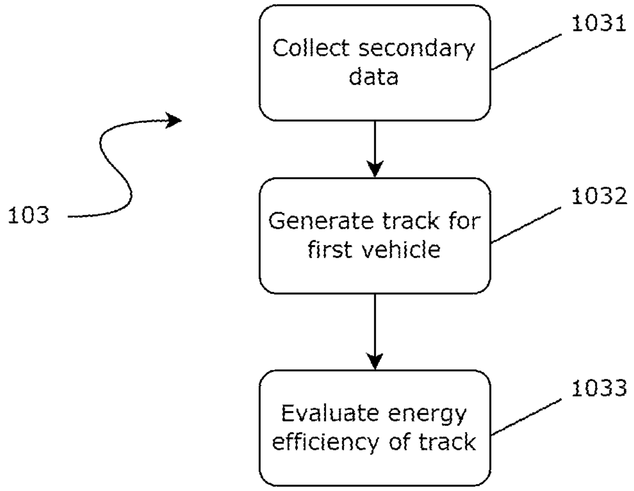
FIG. 4 illustrates an exemplary, non-limiting, diagram for the step 103 of evaluating the passing of a portion of the route by the first motor vehicle.

As shown in FIG. 4, the step 103 of evaluating the passing of a portion of the route by the first motor vehicle, which is also a step of collecting secondary data, comprises, but not limited to, the following steps: a step 1031 of collecting secondary data associated with the first motor vehicle and/or secondary data associated with the portion of the route passed by the first motor vehicle; a step 1032 of generating a track for the first motor vehicle; and a step 1033 of evaluating energy efficiency of the track of the first motor vehicle. For example, but not limited to, the step 1031 of collecting secondary data involves determining the fact of passing the portion of the route by the first motor vehicle, for example, but not limited to, based on the location of the first motor vehicle relative to the boundaries of the portion of the route, as well as (optionally) refining the data associated with the first motor vehicle and/or the portion of the route. In general, it should be noted that, in this step, the actual data associated with the first motor vehicle and/or the portion of the route it has passed are collected. In general, it should be noted that such data may be used to generate the actual track of the first motor vehicle, based on how it passed a given portion of the route. It should also be noted that refined data associated with the first motor vehicle and/or the portion of the route can be used to evaluate energy efficiency of the track generated for the first motor vehicle. In addition, for example, but not limited to, the step 1032 is the same as the step 1012, apart from the fact that the secondary data collected in step 1031 can be used to generate a track for the first motor vehicle along with the primary data associated with the first motor vehicle and/or the portion of the route. Thus, the actual track for the first motor vehicle generated in step 1032 also contains the actual data associated with the first motor vehicle, including, but not limited to, the actual speed profile of the first motor vehicle on the portion of the route and the actual data associated with the portion of the route. In addition, but not limited to, the actual speed profile of the first motor vehicle contains, but not limited to, actual locations of the first motor vehicle on the portion of the route and its actual speeds on the portion of the route that are associated with its actual locations on the portion of the route, as well as actual states of the speed control elements of the first motor vehicle, which are also associated with its actual locations on the portion of the route. In addition, for example, but not limited to, the step 1033 involves evaluating energy efficiency of the track generated for the first motor vehicle. In general, it should be noted that the track generated for the first motor vehicle will be considered energy efficient in case both the time spent by the first motor vehicle to pass the portion of the route and the energy consumed by the first motor vehicle to pass the portion of the route are minimal. Thus, it should be noted that, in step 1033, energy efficiency of the estimated track for the first motor vehicle is compared to that of the track generated for the first motor vehicle. It should also be noted that in case the track generated for the first motor vehicle is more energy-efficient than the estimated track for the first motor vehicle, then the estimated track for the vehicle in operation (second motor vehicle) is generated using the generated (actual) track, even if it is different from the estimated track for the first motor vehicle. Otherwise, it should be noted that the estimated track for the vehicle in operation (second motor vehicle) is also generated based on the actual track for the first motor vehicle, taking into account the secondary data associated with the first motor vehicle and/or the portion of the route passed by it. In addition, the estimated track for the first motor vehicle can also be adjusted based on how the first motor vehicle passed the given portion of the route, using the refined data associated with the first motor vehicle and/or the portion of the route. In this case, energy efficiency of the generated estimated track for the first motor vehicle is evaluated relative to the adjusted estimated track for the first motor vehicle. In general, it should be noted that the estimated track to be generated for the vehicle in operation (second motor vehicle) has to be energy efficient, and it has to be generated taking into account the properties of the actual track of the first motor vehicle. However, it should be obvious to a person having ordinary skill in the art that the estimated track for the first motor vehicle, as was mentioned above, can be any estimated track for the first motor vehicle that contains the data associated with the first motor vehicle and the data associated with the portion of the route to be passed by the first motor vehicle, including, but not limited to, the estimated track for the first motor vehicle that was adjusted in step 102.

Figure 5:
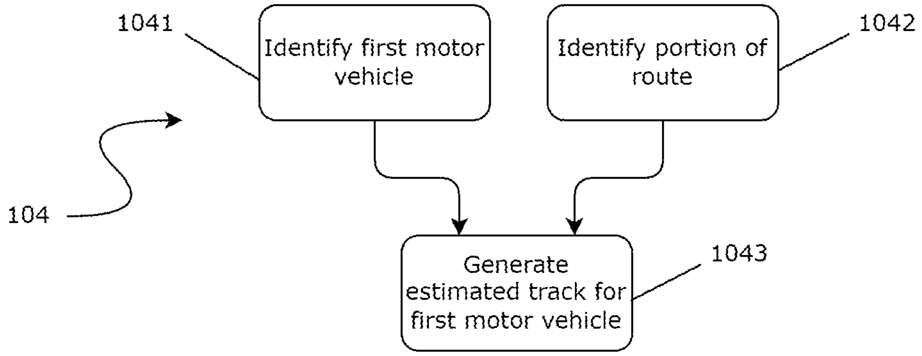
FIG. 5 illustrates an exemplary, non-limiting, diagram for the step 104 of generating an estimated track for the second motor vehicle.

As will be demonstrated below, the steps of generating estimated and/or energy-efficient tracks for the second motor vehicle, as well as for any of the following motor vehicles to pass the portion of the route after the first motor vehicle, are essentially the same and may be interchangeable. For example, without limitation, generation of estimated and/or energy-efficient tracks for the vehicle in operation (second motor vehicle) will be demonstrated, however, as was mentioned above, it should be obvious to a person having ordinary skill in the art that the aforementioned methods can be used to generate corresponding tracks for any motor vehicle that is to pass the given portion of the route after the first motor vehicle. As shown in FIG. 5, the step 104 of generating an estimated track for the vehicle in operation (second motor vehicle) comprises the following steps: a step 1041 of identification the first motor vehicle; a step 1042 of identifying the portion of the route; and a step 1043 of generating an estimated track for the first motor vehicle. For example, but not limited to, the step 1041 is the same as the step 1011, apart from the fact that the collected data associated with the vehicle in operation (second motor vehicle) are not the data associated with the first motor vehicle. In addition, for example, but not limited to, depending on the collected data associated with the vehicle in operation (second motor vehicle), an additional adjustment coefficient, or any other normalization methods may be used, in case the data associated with the vehicle in operation (second motor vehicle) differ from any of the data associated with the first motor vehicle. In addition, for example, but not limited to, in the same step, the data of the portion of the route may also be refined, in case they can be refined without using the data from the track for the first motor vehicle, such as, but not limited to, weather data associated with the portion of the route, which will be relevant at the moment the vehicle in operation (second motor vehicle) passes the given portion of the route, as well as infrastructure data of the portion of the route. In general, it should be noted that the first motor vehicle and the vehicle in operation (second motor vehicle) are different, and therefore energy efficiency of their tracks on a given portion of the route should also be evaluated differently, preferably, but not limited to, in the way of adjusting their values relative to the normalized values. In addition, for example, but not limited to, the step 1042 is the same as the step 1012, apart from the fact that, when collecting the data associated with the portion of the route, the refined data associated with the portion of the route from the track generated for the first motor vehicle are also collected. In general, it should be noted that, in step 1042, the collected data associated with the portion of the route will be more accurate than the similar data from the estimated track for the first motor vehicle. In addition, for example, but not limited to, the step 1043 is the same as the step 1013, apart from the fact that the data from the track generated for the first motor vehicle are collected (and, optionally, normalized) along with the data associated with the first motor vehicle and/or the portion of the route, which are also collected and, optionally, normalized. In general, it should be noted that, in step 1043, there is generated an estimated track for the vehicle in operation (second motor vehicle) that takes into account both the properties of the portion of the route or the characteristics of the vehicle in operation (second motor vehicle) and how the first motor vehicle passed the portion of the route. Preferably, but not limited to, the generated estimated track for the vehicle in operation (second motor vehicle) further contains the estimated speed profile of the vehicle in operation (second motor vehicle), which, in turn, contains at least estimated locations of the vehicle in operation (second motor vehicle) on the portion of the route and estimated speeds of the vehicle in operation (second motor vehicle) on the portion of the route associated with said estimated locations. The estimated speed profile of the vehicle in operation (second motor vehicle) further contains, but not limited to, estimated states of the speed control element of the vehicle in operation (second motor vehicle), which is one of the following: the accelerator pedal of the first motor vehicle, its brake pedal, its retarder, its intarder, its compression brake, decompression brake, its gearbox, or a combination thereof; wherein the state of the speed control element, according to the present disclosure, comprises the positions of the moving parts of the corresponding control element in its active state, i.e. relative to the state, in which the corresponding element is not activated, and/or any other active state of the element, and/or any other non-active state of the element; and wherein the estimated states of the control element are also associated with the corresponding estimated location of the vehicle in operation (second motor vehicle) on the portion of the route. In addition, but not limited to, as was shown above, the speed profile of the vehicle in operation (second motor vehicle) may be normalized according to the data associated with the first motor vehicle. In addition, but not limited to, the speed profile of the vehicle in operation (second motor vehicle) can be adjusted in advance based on the actual speed profile of the first motor vehicle, depending on the refined data associated with the portion of the route. More specifically, but not limited to, in step 1013, the properties of the portion of the route could not be considered with sufficient accuracy, since there were no actual data associated with the portion of the route, such as, but not limited to, the quality of pavement or temporary obstacles, and due to that fact the estimated track for the first motor vehicle could not possibly be energy efficient. In general, it should be noted that the estimated track for the first motor vehicle was generated using the data provided by the motor vehicle itself and external data sources only. However, but not limited to, based on how the first motor vehicle passed the given portion of the route, the track generated for the first motor vehicle can be significantly different from the estimated track for the first motor vehicle, for example, because the operator or the motion control system of the first motor vehicle were constantly assessing the situation on the portion of the route, which allowed the vehicle to pass it with higher energy efficiency than that of the estimated track, including by means of adjusting the estimated track. Thus, the estimated track generated for the vehicle in operation (second motor vehicle) has by any means, not necessarily due to normalization, higher energy efficiency than the estimated track for the first motor vehicle. As will be shown below in the present disclosure, it is the estimated track generated for the vehicle in operation (second motor vehicle) that becomes the pre-generated energy-efficient track for the vehicle in operation.

Figure 6:
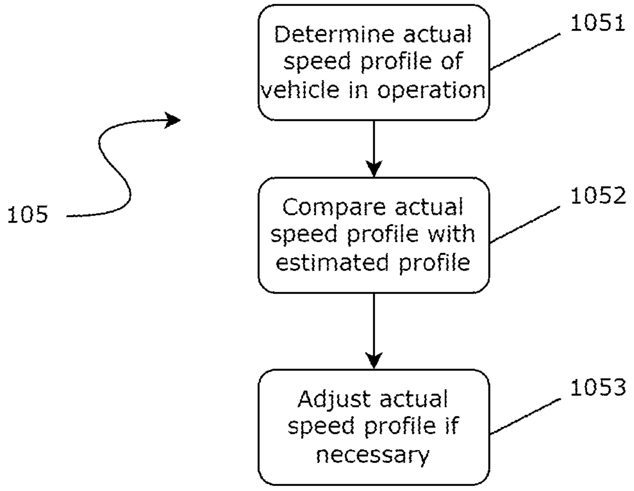
FIG. 6 illustrates an exemplary, non-limiting, diagram for the step 105 of adjusting the estimated track for the second motor vehicle.

As shown in FIG. 6, the optional step 105 of adjusting the estimated track for the vehicle in operation (second motor vehicle), for example, but not limited to, comprises the following steps: a step 1051 of determining the actual speed profile of the vehicle in operation (second motor vehicle) in at least one of the moments when it passes the portion of the route; a step 1052 of comparing the actual speed profile with the corresponding estimated speed profile from the estimated track for the vehicle in operation (second motor vehicle); and, if necessary, a step 1053 of adjusting the actual speed profile in response of the vehicle in operation (second motor vehicle) to the results of said comparison. For example, but not limited to, the step 1051 involves determining the location of the vehicle in operation (second motor vehicle) on the portion of the route, together with at least a single wheel speed of the second motor vehicle in the specified moment in time. In addition, for example, but not limited to, the step 1052 involves determining the estimated wheel speed of at least a single wheel of the vehicle in operation (second motor vehicle) in the specified moment in time, as well as matching the actual wheel speed and the estimated wheel speed. In addition, for example, but not limited to, in case the actual wheel speed differs from the estimated wheel speed, an energy consumption control signal is generated for the second motor vehicle in step 1053. This energy consumption control signal, for example, but not limited to, contains a control signal for the motion control system of the second motor vehicle, which changes the operation of the engine, and/or the brake system, and/or other technical components of the second motor vehicle, so that the actual wheel speed matches the estimated wheel speed in the specified moment in time. However, it should be obvious to a person having ordinary skill in the art that although the adjustment of the estimated track for the vehicle in operation (second motor vehicle) enhances the accuracy of the subsequent generation of the energy-efficient track for the following motor vehicles thus allowing to reduce energy consumption by the following motor vehicles on a specific portion of the route, said adjustment is optional, since the step 103 described above may be sufficient for generating accurate energy-efficient tracks for the following motor vehicles.

Figure 7:
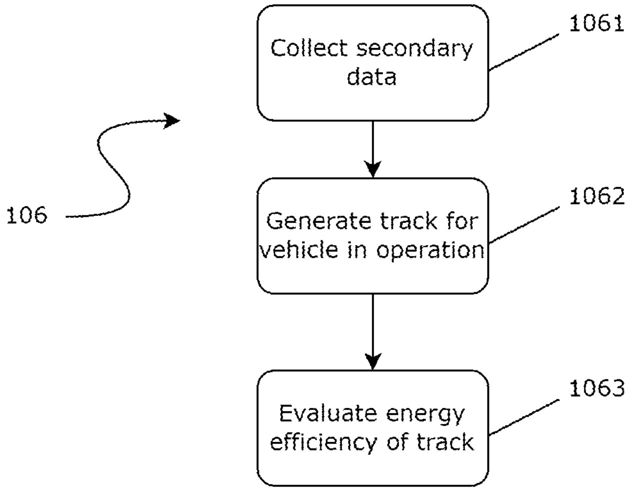
FIG. 7 illustrates an exemplary, non-limiting, diagram for the step 106 of evaluating the passing of a portion of the route by the second motor vehicle.

As shown in FIG. 7, the optional step 106 of evaluating the passing of a portion of the route by the vehicle in operation (second motor vehicle) involves, for example, but not limited to, the following steps: a step 1061 of collecting secondary data associated with the vehicle in operation (second motor vehicle) and/or secondary data associated with the portion of the route passed by the vehicle in operation (second motor vehicle); a step 1062 of generating an actual track for the vehicle in operation (second motor vehicle); and a step 1063 of evaluating energy efficiency of the track of the vehicle in operation (second motor vehicle). For example, but not limited to, the step 1061 of collecting secondary data involves determining the fact of passing the portion of the route by the vehicle in operation (second motor vehicle), for example, but not limited to, based on the location of the vehicle in operation (second motor vehicle) relative to the boundaries of the portion of the route and/or relative to the location of the first motor vehicle at the moment of determining the fact of passing, as well as (optionally) refining the data associated with the vehicle in operation (second motor vehicle) and/or the portion of the route. In general, it should be noted that, in this step, the actual data associated with the vehicle in operation (second motor vehicle) and/or the portion of the route it has passed are collected. In general, it should be noted that such data may be used to generate the actual track of the vehicle in operation (second motor vehicle), based on how it passed a given portion of the route. It should also be noted that refined data associated with the vehicle in operation (second motor vehicle) and/or the portion of the route can be used to evaluate energy efficiency of the actual track generated for the vehicle in operation (second motor vehicle). In addition, for example, but not limited to, the step 1062 is the same as the step 1032, apart from the fact that the secondary data collected in step 1061 can be used to generate the actual track for the vehicle in operation (second motor vehicle) along with the primary data associated with the first motor vehicle and/or the portion of the route, and along with the secondary data collected in step 1032. Thus, the actual track for the vehicle in operation (second motor vehicle) generated in step 1062 also contains the actual data associated with the vehicle in operation (second motor vehicle), including the actual speed profile of the vehicle in operation (second motor vehicle) on the portion of the route and the actual data associated with the portion of the route, wherein these data may optionally be normalized relative to the data collected in step 1032. In addition, for example, but not limited to, the step 1063 involves evaluating energy efficiency of the track generated for the vehicle in operation (second motor vehicle). In general, it should be noted that the track generated for the vehicle in operation (second motor vehicle) will be considered energy efficient in case both the time spent by the vehicle in operation (second motor vehicle) to pass the portion of the route and the energy consumed by the vehicle in operation (second motor vehicle) to pass the portion of the route are minimal. Thus, it should be noted that, in step 1063, energy efficiency of the estimated track for the vehicle in operation (second motor vehicle) is compared to that of the actual track generated for the vehicle in operation (second motor vehicle). It should also be noted that in case the actual track for the vehicle in operation (second motor vehicle) is more energy-efficient than the estimated track for the vehicle in operation (second motor vehicle), then the estimated track for any of the following motor vehicles is generated using the generated (actual) track for the vehicle in operation (second motor vehicle), even if it is different from the estimated track for the vehicle in operation (second motor vehicle), wherein the following motor vehicle is any motor vehicle that is to pass the given portion of the route after the vehicle in operation (second motor vehicle). Otherwise, it should be noted that the estimated track for the following motor vehicle is also generated based on the actual track for the vehicle in operation (second motor vehicle), taking into account the secondary data associated with the vehicle in operation (second motor vehicle) and/or the portion of the route passed by it. In addition, the estimated track for the vehicle in operation (second motor vehicle) can also be adjusted based on how the vehicle in operation (second motor vehicle) passed the given portion of the route, using the refined data associated with the vehicle in operation (second motor vehicle) and/or the portion of the route. In this case, energy efficiency of the generated estimated track for the vehicle in operation (second motor vehicle) is evaluated relative to the adjusted estimated track for the vehicle in operation (second motor vehicle). In general, it should be noted that the estimated track to be generated for the following motor vehicle has to be energy efficient, and it has to be generated taking into account the properties of the actual track of the vehicle in operation (second motor vehicle). However, it should be obvious to a person having ordinary skill in the art that although the evaluation of how the vehicle in operation (second motor vehicle) passes a given portion of the route enhances the accuracy of the subsequent generation of the energy-efficient tracks for the following motor vehicles thus allowing to reduce energy consumption by these motor vehicles on a specific portion of the route, said evaluation is optional, since the aforementioned estimated track for the vehicle in operation, or even the aforementioned estimated track for the vehicle in operation (second motor vehicle), may be sufficient for subsequent generation of a model energy-efficient track for any of the following motor vehicles.

The optional step 107 of generating a track database involves, for example, but not limited to, collecting a plurality of tracks of motor vehicles generated based on how these motor vehicles, i.e., at least the first motor vehicle and the vehicle in operation (second motor vehicle), passed the portion of the route. For example, but not limited to, in step 107, the plurality of tracks of motor vehicles that have passed the portion of the route are collected. In addition, for example, but not limited to, in step 107, the collected tracks are systematized, so that these data can be used to generate a plurality of estimated tracks for the following motor vehicles. In addition, but not limited to, the plurality of such tracks can be used as an input for analysis, including by machine learning tools, in order to generate the most energy-efficient (model) track that would be suitable for any motor vehicle. Such model track can be unique for each motor vehicle and can subsequently be used as the estimated track for the first motor vehicle, whereupon the steps according to the method for generating an energy-efficient track will be performed again in order to generate a different model track for the same motor vehicle. In addition, but not limited to, such data can be used to change the properties of the portion of the route so as to ensure the generation of the most energy-efficient model track. However, it should be obvious to a person having ordinary skill in the art that although the forming of the track database enhances the accuracy of the subsequent generation of the energy-efficient tracks for the following motor vehicles thus allowing to reduce energy consumption by these motor vehicles on a specific portion of the route, said evaluation is optional, since the aforementioned estimated track for the vehicle in operation, or even the aforementioned estimated track for the vehicle in operation (second motor vehicle), may be sufficient for subsequent generation of model energy-efficient tracks for the following motor vehicles.

As was shown above the aforementioned portions of the route may contain the aforementioned acceleration points and/or deceleration points, including estimated acceleration points and/or deceleration points, and the generated tracks for motor vehicles may contain data associated with respective actual acceleration points and/or deceleration points, as well as data associated with mismatches between actual points and estimated points. The aforementioned deceleration points can be considered to be possible deceleration points at the same time and may include both mandatory deceleration points and non-mandatory deceleration points, which will be described in more detail below. For instance, but not limited to, the portions of the route located in urban areas will be often characterized by additional features. For example, but not limited to, a portion of the route located in an urban area may contain a mandatory deceleration point resulting from the necessity to decrease the speed of motor vehicles within the given portion of the route in accordance with traffic safety regulations. Such mandatory deceleration point is a coordinate on the portion of the route, at which a motor vehicle has to start its movement without positive acceleration. Preferably, but not limited to, an urban area contains at least a plurality of intersecting and/or joining, and/or adjoining portions of the route, wherein each such portion of the route may contain at least one mandatory deceleration point. Such mandatory deceleration point may be one of the following: a mandatory deceleration point on a portion of the route that is adjoined or intersected by an other portion of the route, a mandatory deceleration point on a portion of the route containing an infrastructure element, which controls the movement of motor vehicles on the portion of the route, a mandatory deceleration point on a portion of the route containing a traffic sign providing a speed limit for motor vehicles on the portion of the route, a mandatory deceleration point on a portion of the route containing an obstacle, or other mandatory deceleration points resulting from the characteristics of the portion of the route, and/or a combination thereof. Preferably, but not limited to, the data associated with the portion of the route may include some data associated with the mandatory deceleration points. Preferably, but not limited to, the coordinates of the mandatory deceleration points for each portion of the route are defined in advance, so that they can be obtained as data during the step of collecting primary data, in which the data associated with the portion of the route to be passed by the first motor vehicle are collected. In addition, preferably, but not limited to, the data associated with mandatory deceleration points are defined such that the estimated track for the first motor vehicle is energy efficient. For example, but not limited to, when the portion of the route is a portion of the route adjoined by another portion of the route (e.g., but not limited to, the portion of the route to be passed by the first motor vehicle contains a turn that connects the the portion of the route to be passed by the first motor vehicle with said another portion of the route, i.e. these portions of the route together from a T-intersection, but not limited to), the data associated with a mandatory deceleration point will include such coordinates of the mandatory deceleration point, at which the motor vehicle has to start moving at least without positive acceleration, or, but not limited to, with a suitable negative acceleration, wherein said coordinates may ensure that the movement of the motor vehicle along a trajectory connecting the portion of the route to be passed by the first motor vehicle with said another portion of the route is energy efficient, and wherein such energy efficient movement of the motor vehicle is also safe, as it ensures that the motor vehicle reduces its speed as required before making the turn. For example, but not limited to, when the portion of the route is a portion of the route intersected by another portion of the route (e.g., but not limited to, the portion of the route to be passed by the first motor vehicle intersects said another portion of the route at any angle, i.e. these portions of the route together from an X-intersection, but not limited to), the data associated with a mandatory deceleration point will include such coordinates of the mandatory deceleration point, at which the motor vehicle has to start moving at least without positive acceleration, or, but not limited to, with a suitable negative acceleration, wherein said coordinates may ensure that the movement of the motor vehicle along a trajectory crossing said another portion of the route is energy efficient, and wherein such energy efficient movement of the motor vehicle is also safe, as it ensures that the motor vehicle reduces its speed as required before passing a dangerous portion of the route, in which the trajectory of said motor vehicle may intersect that of another motor vehicle moving along said another portion of the route. For example, but not limited to, when the portion of the route is a portion of the route containing an infrastructure element (e.g., but not limited to, a traffic light, and/or a speed enforcement camera, and/or a traffic enforcement camera), which controls the movement of motor vehicles on the portion of the route, the data associated with a mandatory deceleration point will include such coordinates of the mandatory deceleration point, at which the motor vehicle has to start moving at least without positive acceleration, or, but not limited to, with a suitable negative acceleration, wherein said coordinates may ensure that the movement of the motor vehicle along trajectories requiring the motor vehicle to slow down significantly or stop in an allowed space in accordance with the signals provided by the infrastructure element is energy efficient, which, therefore, ensures that the motor vehicle slows down in an energy-efficient way, and the traffic on the portion of the route is safe. For example, but not limited to, when the portion of the route is a portion of the route containing a traffic sign (e.g., but not limited to, a sign providing a speed limit for the portion of the route, a sign warning of road works on the portion of the route, a priority sign, or any other traffic signs forcing motor vehicles to change their speed), the data associated with a mandatory deceleration point will include such coordinates of the mandatory deceleration point, at which the motor vehicle has to start moving at least without positive acceleration, or, but not limited to, with a suitable negative acceleration, wherein said coordinates may ensure that the movement of the motor vehicle along trajectories requiring the motor vehicle to slow down significantly or stop in an allowed space in accordance with the traffic regulations concerning the traffic sign in place, which, therefore, ensures that the motor vehicle slows down in an energy-efficient way, and the traffic on the portion of the route is safe. In addition, the data associated with the traffic sign in place may be either associated in advance with the given portion of the route based on the information from an external database, or read by the motor vehicle's environmental sensors, including, for example, but not limited to, the first motor vehicle's environmental sensors, such as a camera, but not limited to. In addition, such data may be subsequently used to generate an energy-efficient track for the vehicle in operation (second motor vehicle). For example, but not limited to, when the portion of the route is a portion of the route containing an obstacle (e.g., but not limited to, a permanent obstacle, such as, but not limited to, an artificial irregularity, or a temporary obstacle, such as damaged pavement, road works, a rockslide, a traffic accident, or any other obstacle forcing motor vehicles to change their speed), the data associated with a mandatory deceleration point will include such coordinates of the mandatory deceleration point, at which the motor vehicle has to start moving with a suitable negative acceleration, wherein said coordinates may ensure that the movement of the motor vehicle along trajectories requiring the motor vehicle to slow down significantly in order to pass through or go around the obstacle in accordance with the traffic regulations concerning the obstacle in place is energy efficient, which, therefore, ensures that the motor vehicle slows down in an energy-efficient way, and the traffic on the portion of the route is safe. In addition, the data associated with the obstacle may be either associated in advance with the given portion of the route based on the information from an external database, or read by the motor vehicle's environmental sensors, including, for example, but not limited to, the first motor vehicle's environmental sensors, such as a camera, but not limited to. In addition, such data may be subsequently used to generate an energy-efficient track for the vehicle in operation (second motor vehicle).

In addition, but not limited to, the data associated with the portion of the route to be passed by the first motor vehicle may further include any of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof. Such additional data, preferably, but not limited to allow to generate energy-efficient and safe estimated tracks for motor vehicles in situations, where a plurality of motor vehicles are moving in an urban area.

For example, but not limited to, an estimated track for the motor vehicle may be generated, in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to intersect said another portion of the road without stopping. In addition, but not limited to, the data obtained from a traffic control means, such as, but not limited to, traffic lights, signal that it is allowed to move as described above without stopping, when the first motor vehicle reaches the mandatory deceleration point. In addition, but not limited to, an estimated track for the first motor vehicle may be generated, wherein, but not limited to, the time that the first motor vehicle requires to pass said another portion of the road moving from the mandatory deceleration point to the end point of passing said another portion of the road is also calculated. In addition, the end point of passing said another portion of the route, preferably, but not limited to, is not located on said another portion of the route and preferably, but not limited to, is located along the direction of movement of the first motor vehicle and along the trajectory that intersects said another portion of the route. Preferably, but not limited to, based on the time calculation, an estimated speed profile of the first motor vehicle for the estimated track for the first motor vehicle is generated, wherein the estimated speed profile contains at least one of the following: the first motor vehicle moving through the mandatory deceleration point without changing its speed; the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the route; or the first motor vehicle moving through the mandatory deceleration point while increasing its speed so as to pass through said another portion of the route within the time limit that corresponds to the previously calculated time that the first motor vehicle requires to pass said another portion of the route. In addition, preferably, but not limited to, as soon as the time calculation establishes that the motor vehicle, upon reaching the mandatory deceleration point, will be moving in accordance with a pre-defined speed profile, and such movement will ensure that it passes the portion of the route smoothly along the trajectory, which intersects said another portion of the route, with enough time before the traffic control means (traffic lights) switches its signals, an estimated speed profile will be generated, the profile including at least the first motor vehicle moving through the mandatory deceleration point without changing its speed, or, but not limited to, without changing its pre-defined speed profile. In addition, preferably, but not limited to, as soon as the time calculation establishes that the motor vehicle, upon reaching the mandatory deceleration point, will be moving in accordance with a pre-defined speed profile, and such movement will not ensure that it passes the portion of the route smoothly along the trajectory, which intersects said another portion of the route, within the time remaining before the traffic control means (traffic lights) switches its signals, an estimated speed profile will be generated, the profile including at least the first motor vehicle moving through the mandatory deceleration point while reducing its speed until it stops completely in the mandatory stop point, wherein the mandatory stop point is located after the mandatory deceleration point along the direction of movement of the first motor vehicle and within the portion of the route it is moving along, i.e. before the area that lies within said another portion of the route to be crossed, and, therefore, the mandatory stop point is located along the direction of movement of the first motor vehicle and along the trajectory that does not intersect said another portion of the road. In addition, preferably, but not limited to, as soon as the time calculation establishes that the motor vehicle, upon reaching the mandatory deceleration point, will be moving in accordance with a pre-defined speed profile, and such movement will not ensure that it passes the portion of the route smoothly along the trajectory, which intersects said another portion of the route, within the time remaining before the traffic control means (traffic lights) switches its signals, but at the same time it has been established that the motor vehicle will be able to pass the portion of the route within the remaining time in case it increases its speed within allowed limits, an estimated speed profile will be generated, the profile including at least the first motor vehicle moving (with a speed that is allowed on the given portion of the route) through the mandatory deceleration point while increasing its speed so as to pass through said another portion of the route within the time limit that corresponds to the previously calculated time that the first motor vehicle requires to pass said another portion of the road. In addition, but not limited to, the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof. Preferably, but not limited to, the data associated with motor vehicles moving along the portion of the route before the first motor vehicle, or before the vehicle in operation (second) motor vehicle, as well as motor vehicles moving along other portions of the route, may be transferred and propagated in data exchange environments based on data exchange technologies, such as vehicle-to-vehicle (V2V) and vehicle-to-everything (V2X). In addition, but not limited to, the estimation may be obtained by analyzing the database, which is formed, as was described above with reference to FIG. 7, for example, but not limited to, in the form of statistics, depending, for example, but not limited to, on time, or in the form of data processed using machine learning methods. Therefore, after these data have been obtained, the estimated tracks for the first motor vehicle, the vehicle in operation (second motor vehicle), and all the following motor vehicles may include changes to the mandatory deceleration points that were defined in advance, adding new acceleration points to the portion of the route, adding new deceleration points to the portion of the route, and other changes, which prevent the trajectories of motor vehicles from intersecting, while also ensuring that their movement along connected portions of the route or within the given portion of the route is energy efficient.

For example, but not limited to, an estimated track for the motor vehicle may also be generated, in case when the data associated with the mandatory deceleration point are the data associated with the mandatory deceleration point located on the portion of the route intersected by another portion of the route and when the infrastructure data of the portion of the route contain data obtained from a traffic control means signaling that it is not allowed to intersect said another portion of the route without stopping. In addition, the data from the traffic control means (traffic lights), preferably, but not limited to, are obtained for the moment when the first motor vehicle would reach the mandatory deceleration point. In addition, but not limited to, an estimated track for the first motor vehicle may be generated, wherein the time when the traffic control means would again signal that it is allowed to intersect said another portion of the road without stopping is also calculated; and, based on the time calculation, for example, but not limited to, the mandatory deceleration point is relocated so as to allow the first motor vehicle to move along the trajectory that intersects said another portion of the route without stopping, when the traffic control means signals that it is allowed to intersect said another portion of the road without stopping, and thus preventing an unwanted stop of the motor vehicle and ensuring traffic safety on the given portion of the route. In addition, but not limited to, the data associated with the portion of the route include at least data associated with several mandatory deceleration points. In addition, but not limited to, the data associated with mandatory deceleration points are data associated with mandatory deceleration points on the portion of the route that are located, respectively, before other portions of the route intersecting said portion of the route. In addition, but not limited to, the data obtained from traffic control means are associated with each respective other portion of the route. Therefore, but not limited to, the aforementioned steps of obtaining and calculating time, and replacing the mandatory deceleration point, can be performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

For example, but not limited to, in case the data associated with the portion of the route to be passed by the first motor vehicle further include at least data associated with a motor vehicle located on said another portion of the route, an estimated track for the motor vehicle may be generated. In addition, but not limited to, a track for the motor vehicle located on said another portion of the route may be generated, wherein said track may contain at least, but not limited to, data associated with said another portion of the route that motor vehicle is moving along, and wherein the data associated with said another portion of the route include, but not limited to, data associated with the trajectory of the motor vehicle moving along said another portion of the route. In addition, but not limited to, the data associated with the portion of the route to be passed by the first motor vehicle may further include data associated with the trajectory of the first motor vehicle. In addition, but not limited to, said trajectory data include data associated with an intersection between the first motor vehicle's trajectory and that of the motor vehicle moving along said another portion of the route, the mandatory deceleration point may be relocated so as to prevent the first motor vehicle and the motor vehicle moving along said another portion of the route from reaching said intersection at the same time, while also enabling the first motor vehicle to move along its trajectory without stopping, and thus it may be possible to ensure that the movement of motor vehicles along the portion of the route is both safe and energy efficient.

For example, but not limited to, in case the data associated with the portion of the route to be passed by the first motor vehicle further include at least data associated with a motor vehicle located on the portion of the route at the mandatory deceleration point or in its vicinity, an estimated track for the motor vehicle may be generated. Therefore, preferably, but not limited to, a track for a motor vehicle that is located in the direction of movement of the first motor vehicle may be generated; and the mandatory deceleration point may relocated so as to generate an estimated track for the first motor vehicle that would correspond to the estimated track for the motor vehicle on the portion of the route at the mandatory deceleration point or in its vicinity, wherein the first motor vehicle is moving along the portion of the route at a lesser speed than the motor vehicle on the portion of the route at the mandatory deceleration point or in its vicinity, thus preventing the aforementioned motor vehicles from being present in the same point of the portion of the route at the same time.

For example, but not limited to, the data associated with the portion of the route to be passed by the first motor vehicle may further include at least one of the following: estimation of a motor vehicle being present on another portion of the route, estimation of a motor vehicle being present on the portion of the route at the mandatory deceleration point or in its vicinity, or a combination thereof. In addition, for example, but not limited to, in case the data associated with the portion of the route to be passed by the first motor vehicle further include the estimation of a motor vehicle being present on said another portion of the route, an estimated track for the motor vehicle that may be present on said another portion of the route is generated. In addition, but not limited to, the aforementioned estimated track may contain at least data associated with said another portion of the route that motor vehicle may be moving along, and, but not limited to, the data associated with said another portion of the route may include data associated with the estimated trajectory of the motor vehicle, which may be moving along said another portion of the route. In addition, but not limited to, the data associated with the portion of the route to be passed by the first motor vehicle may further include data associated with the trajectory of the first motor vehicle, and, but not limited to, in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point may be relocated so as to prevent the first motor vehicle and the motor vehicle moving along said another portion of the route from reaching said intersection at the same time. In addition, preferably, but not limited to, the first motor vehicle may be enabled to move along its trajectory without stopping. In addition, but not limited to, in case the data associated with the portion of the route to be passed by the first motor vehicle further include the estimation of a motor vehicle being present on the portion of the route at the mandatory deceleration point or in its vicinity, an estimated track for that motor vehicle may be also generated, and the mandatory deceleration point may be relocated so as to generate an estimated track for the first motor vehicle that would correspond the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

In addition, but not limited to, any aforementioned portion of the route, regardless of whether it is a part of an urban area, may contain a non-mandatory deceleration point. Preferably, but not limited to, such non-mandatory deceleration point, unlike a mandatory deceleration point, does not force the driver to decrease the speed of the motor vehicle, but in effect can be used to do just this. For example, but not limited to, a portion of the route may contain an incline that may be passed by a motor vehicle with either the same speed, an acceleration, or a deceleration, which allows a non-mandatory deceleration point to be placed on said portion of the route. For example, but not limited to, a portion of the route may contain some sort of visual obstruction, which is not critical and thus does not force the motor vehicle to slow down when moving along said portion of the route. For example, but not limited to, such visual obstructions can be caused by weather conditions on the given portion of the route, such as, for instance, fog, rain, snowfall, sunshine, etc. In addition, but not limited to, fog, rain, or snowfall on the given portion of the route may not always force the motor vehicle to slow down, especially if the vehicle is already moving with a speed that is allowed for the given weather conditions. In addition, but not limited to, visual obstructions may be caused even by bright sunshine, e.g., by short-term glares, which may not always force the motor vehicle to slow down, especially if the vehicle is already moving with a speed that is allowed for the given portion of the route. For example, but not limited to, visual obstructions on a portion of the route can be caused by changes in illumination, e.g., but not limited to, during the night, when the vehicle crosses from an illuminated portion of the route to an unilluminated portion of the route. However, but not limited to, such situation also may not force the motor vehicle to slow down, especially if the vehicle is already moving with a speed that is allowed for the given portion of the route. However, but not limited to, non-mandatory deceleration points may be placed on such portions of the route in order to improve traffic safety. However, it should be obvious to a person having ordinary skill in the art that the aforementioned—or similar—visual obstructions may not be inherent to a given portion of the route but may appear at certain moments in time or may depend on weather conditions. For example, but not limited to, fog, rain, or snowfall are not inherent to any given portion of the route, but they may appear at certain moments in time or due to certain weather conditions. For example, but not limited to, bright sunlight causing visual obstructions is not inherent to any given portion of the route, but it may appear at a certain time of day, when the vehicle is moving in a certain direction. For example, changes in illumination of a given portion of the route causing visual obstructions may happen at a certain time of day or depend the state of the infrastructure on the given portion of the route.

In addition, but not limited to, the methods and means disclosed above may be used, particularly, to generate the most optimal estimated track for the first motor vehicle. In addition, but not limited to, energy efficiency of the actual track for the motor vehicle is analyzed using the method disclosed above, wherein, based on the results of the analysis, after the estimated track for the vehicle in operation (second motor vehicle) has been generated, the same additional data associated with the portion of the route may be used, which have already been used when generating the estimated track for the first motor vehicle, or, for example, but not limited to, some data may be omitted, because they were not corroborated by the actual results of how the first motor vehicle passed the portion of the route. In addition, but not limited to, aforementioned possible deceleration points that include mandatory deceleration points and/or non-mandatory deceleration points may be used to activate braking electrical recuperation systems in order to improve energy efficiency on a given portion of the route. In addition, but not limited to, the step 101 of generating a track for the first motor vehicle, described above, may include energy-efficiency evaluation of the first motor vehicle on the passed portion of the route, which may further include energy-efficiency evaluation of the first motor vehicle on the passed portion of the route along with energy-efficiency evaluation of the braking electrical recuperation system of the first motor vehicle, which is activated depending on, but not limited to, the corresponding possible deceleration point. In addition, but not limited to, it should be noted that energy-efficiency of the braking electrical recuperation system of the first motor vehicle is evaluated, and said evaluation may be at least either positive or negative, thus allowing to use the evaluation results when generating an estimated track for the second motor vehicle. In addition, but not limited to, certain threshold values can be set for the energy-efficiency evaluation of the electrical recuperation system to be considered positive. In addition, but not limited to, it should be generally noted that any electric energy replenishment with the help of a braking electrical recuperation system results in a higher energy efficiency of the motor vehicle on the portion of the route than the one obtained when the motor vehicle has passed the portion of the route without making use of its braking electrical recuperation system. Therefore, but not limited to, the vehicle in operation (second motor vehicle) may also act as the first motor vehicle for any following motor vehicle to be moving along the portion of the route, with which the additional data and mandatory deceleration points are associated. Therefore, safer and more energy efficient tracks may be continuously generated for the following motor vehicles, and the resulting data and estimated tracks can be stored in the database to be used subsequently, for example, but not limited to, to model and generate increasingly more optimized energy efficient and safe tracks.

Figure 8:
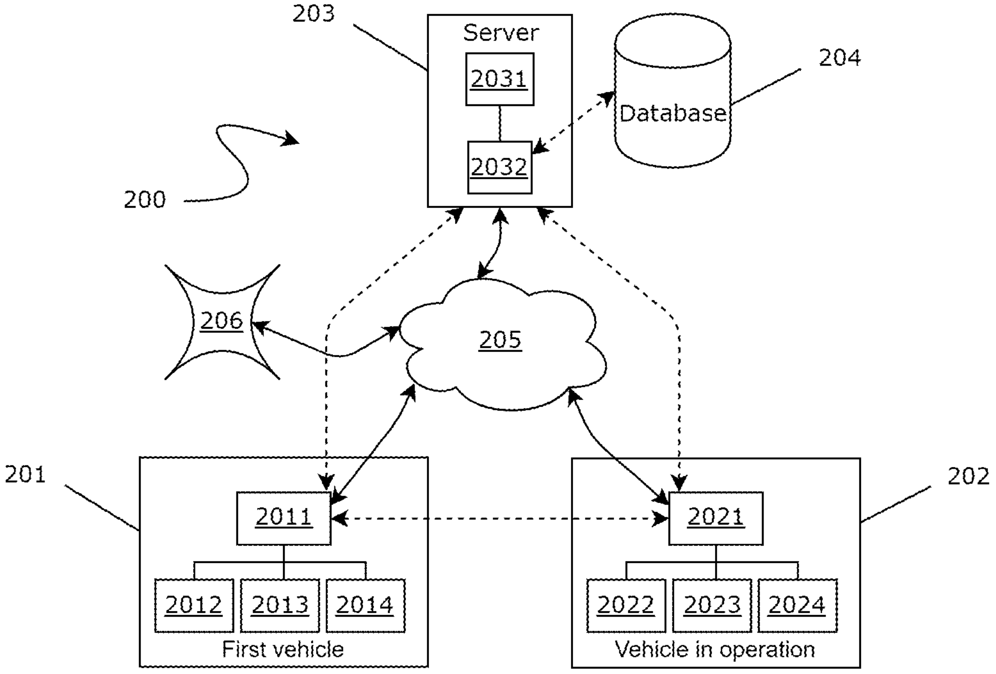
FIG. 8 illustrates an exemplary, non-limiting diagram for the system 200 for generating an energy-efficient track for an energy-efficient vehicle in operation moving along a portion of the route containing a possible deceleration point.

FIG. 8 illustrates an exemplary, non-limiting, diagram for the system 200 for generating an energy-efficient track for the motor vehicle. For example, but not limited to, the claimed system 200 comprises the server 203 that communicates at least with the aforementioned transceivers 2011, 2021 of the first motor vehicle 201 and the vehicle in operation (second motor vehicle) 202, respectively. In addition, but not limited to, the server 203 is a computer device comprising at least a CPU 2031 and a memory 2032. In addition, but not limited to, the memory (computer-readable medium) of the server 203 contains the program code that, when implemented, induces the CPU to perform the steps according to the method for generating an energy-efficient track for the motor vehicle that was described above. For example, but not limited to, the computer-readable medium (memory 2031) may comprise a non-volatile memory (NVRAM); a random-access memory (RAM); a read-only memory (ROM); an electrically erasable programmable read-only memory (EEPROM); a flash drive or other memory technologies; a CD-ROM, a digital versatile disk (DVD) or other optical/holographic media; magnetic tapes, magnetic film, a hard disk drive or any other magnetic drive; and any other medium capable of storing and encoding the necessary information. In addition, but not limited to, the memory 2032 comprises a computer-readable medium based on the computer memory, either volatile or non-volatile, or a combination thereof. In addition, but not limited to, exemplary hardware devices include solid-state drives, hard disk drives, optical disk drives, etc. In addition, but not limited to, the computer-readable medium (memory 2032) is not a temporary memory (i.e., a permanent, non-transitive memory), and therefore it does not contain a temporary (transitive) signal. In addition, but not limited to, the memory 2032 may store an exemplary environment, wherein the procedure of generating an energy-efficient track for the motor vehicle may be implemented using computer-readable commands or codes that are stored in the memory of the server. In addition, but not limited to, the server 203 comprises one or more CPUs 2031 which are designed to execute computer-readable commands or codes that are stored in the memory 2032 of the device in order to implement the procedure of generating an energy-efficient track for the motor vehicle. In addition, but not limited to, the system 200 may further comprise a database 204. The database 204 may be, but not limited to, a hierarchical database, a network database, a relational database, an object database, an object-oriented database, an object-relational database, a spatial database, a combination of two or more said databases, etc. In addition, but not limited to, the database 204 stores the data to be analyzed in the memory 2032 or in the memory of a different computer device that communicates with the server 203, which may be, but not limited to, a memory that is similar to any of the memories 2032, as described above, and which can be accessed via the server 203. In addition, but not limited to, the database 204 stores the data comprising at least commands to perform the steps according to the method 100 as described above; the processed data associated with the first motor vehicle and/or the vehicle in operation (second motor vehicle), and/or the portion of the route, including refined data; estimated and generated tracks for motor vehicles; navigational data; model tracks for motor vehicles; etc. In addition, but not limited to, the exemplary system 200 further comprises, respectively, at least the first vehicle 201 and the vehicle in operation (second motor vehicle) 202. Such vehicles 201, 202 usually comprise corresponding transceivers 2011, 2021 adapted to sending the data to the server 203 that communicates with motion control systems 2012, 2022 of respective vehicles and/or with on-board information systems 2013, 2023 (if present) of respective vehicles. Optionally, but not limited to, such motor vehicles may comprise various sensors 2014, 2024 to collect data that are associated with the corresponding motor vehicle in operation, and/or the portion of the route. In addition, but not limited to, the such sensors 2014, 2024 include a positioning sensor, speed sensors (such as, but not limited to, a crankshaft position sensor, a camshaft position sensor, a throttle position sensor, an accelerator pedal position sensor, a wheel speed sensor, a power consumption sensor, e.g. injection rate or current voltage characteristic), energy consumption sensors (such as, but not limited to, fuel level sensors, battery sensors, an accelerator pedal position sensor, injection rate sensor, and an RPM sensor), temperature sensors (such as, but not limited to, a coolant temperature sensor, an ambient temperature sensor, an in-car temperature sensor), pressure sensors (such as, but not limited to, an intake manifold pressure sensor, a fuel injection pressure sensor, a tyre pressure sensor), environmental sensors (such as, but not limited to, a light level sensor, a rain sensor, a radar, a lidar, a video camera, a sonar), and sensors and speed control elements of the motor vehicle, as well as other elements of the motion control system of the motor vehicle. In addition, but not limited to, there is provided a server 203, which, in addition to the functions mentioned above, stores and facilitates the execution of computer-readable commands and codes disclosed herein, which, accordingly, won't be described again. In addition, but not limited to, the server 203, in addition to the functions mentioned above, is capable of controlling the data exchange in the system 200. In addition, but not limited to, data exchange within the system 200 is performed with the help of one or more data exchange networks 205. In addition, but not limited to, data exchange networks 205 may include, but not limited to, one or more local area networks (LAN) and/or wide area networks (WAN), or may be represented by the Internet or Intranet, or a virtual private network (VPN), or a combination thereof, etc. In addition, but not limited to, the server 203 is further capable of providing a virtual computer environment for the components of the system to interact with each other. In addition, but not limited to, the network 205 provides interaction between transceivers 2011, 2021 on motor vehicles 201, 202, the server 203, and the database 204 (optionally). In addition, but not limited to, the server 203 and the database 204 may be connected directly using conventional wired or wireless communication means and methods, which, accordingly, are not described in further detail. In addition, but not limited to, the system 200 may optionally comprise infrastructure elements 206 of the portion of the route, specifically, various technical means capable of collecting the aforementioned data that are associated with motor vehicles and/or the portion of the route, and optionally can provide the aforementioned network 205 for data exchange on the portion of the route. For example, but not limited to, such elements 206 include a weather station, a speed monitoring camera, an infrastructural transceiver of the portion of the route, pavement weight sensors, etc., as well as the data from other motor vehicles that may or may not be involved with the system 200, the data transferred and propagated in data exchange environments based on data exchange technologies, such as vehicle-to-vehicle (V2V) and vehicle-to-everything (V2X). In addition, but not limited to, one of the aforementioned on-board information systems 2013, 2023, in case it is a computer device comprising a CPU and a memory that are similar to the aforementioned CPU 2031 and memory 2032, may be represented by the aforementioned server 203 with its basic functions, wherein the aforementioned transceivers 2011, 2012 may communicate with each other using any data exchange network or directly, via wireless communication, such as, but not limited to, radio communication, acoustic communication, infrared communication, laser communication, etc., wherein the aforementioned database 204 may be implemented directly within the memory of any of the on-board information systems 2013 and 2023 (if present). In addition, but not limited to, the aforementioned motor vehicles, which are not the first motor vehicle, second motor vehicle, or the vehicle in operation, such as motor vehicles located on other portions of the route, may be represented by motor vehicles that are similar to the aforementioned motor vehicles 201, 202, and, therefore, they may be equipped with similar transceivers, motion control systems, on-board information systems, etc.

The present disclosure of the claimed invention demonstrates only certain exemplary embodiments of the invention, which by no means limit the scope of the claimed invention, meaning that it may be embodied in alternative forms that do not go beyond the scope of the present disclosure and which may be obvious to persons having ordinary skill in the art.

The invention claimed is:

1. A method for generating a recuperation energy-efficient track for a vehicle in operation equipped with a braking electric recuperation system moving along a portion of a route that includes a possible deceleration point, the method comprising at least the following steps:

collecting primary data, which involves obtaining data associated with a first motor vehicle equipped with the braking electric recuperation system; data associated with a portion of a route to be passed by the first motor vehicle, and data associated with a second motor vehicle, wherein the second motor vehicle is also the vehicle in operation and passes the portion of the route after the first motor vehicle, and wherein the data associated with the portion of the route include at least data associated with a possible deceleration point;

collecting secondary data, which involves generating a track for the first motor vehicle, wherein said track is generated based on how the first motor vehicle passed the portion of the route, and wherein the braking electric recuperation system is activated when the first motor vehicle is braking while moving along the portion of the route and passing the possible deceleration point;

generating an estimated track for the second motor vehicle, wherein said estimated track is generated based on a track generated for the first motor vehicle;

wherein the track for the first motor vehicle is generated by performing the following steps:

generating a speed profile of the first motor vehicle on the passed portion of the route, and evaluating energy efficiency of the first motor vehicle on the passed portion of the route;

wherein energy efficiency of the first motor vehicle on the passed portion of the route is evaluated on a basis of efficiency of the braking electric recuperation system of the first motor vehicle;

wherein the data associated with the possible deceleration point include one of the following: data associated with a mandatory deceleration point, data associated with a non-mandatory deceleration point, and/or a combination thereof;

wherein the data associated with a mandatory deceleration point include one of the following: data associated with a mandatory deceleration point on the portion of the route that is adjoined or intersected by another portion of the route, data associated with a mandatory deceleration point on a portion of the route containing an infrastructure element, which controls the movement of motor vehicles on the portion of the route, data associated with a mandatory deceleration point on a portion of the route containing a traffic sign providing a speed limit for motor vehicles on the portion of the route, data associated with a mandatory deceleration point on a portion of the route containing an obstacle, data associated with a mandatory deceleration point on a portion of the route containing a turn, and/or a combination thereof;

and wherein the data associated with a non-mandatory deceleration point include one of the following: data associated with a non-mandatory deceleration point on a portion of the route containing an incline, data associated with a non-mandatory deceleration point on a portion of the route containing a visual obstruction, and/or a combination thereof;

wherein the primary data associated with the first motor vehicle and the primary data associated with the portion of the route form an estimated track for the first motor vehicle, wherein such estimated track further contains an estimated speed profile of the first motor vehicle.

2. The method of claim 1, characterized in that the data associated with the first and/or second motor vehicle include at least one of the following: the type and model of the first motor vehicle, its mass, its aerodynamic characteristics, its wheel formula, its estimated and/or actual energy consumption and data from its acceleration sensors and/or speed sensors, data from its positioning sensors, weight sensors, and wheel speed sensors, or a combination thereof; wherein the data associated with the portion of the route to be passed by the first motor vehicle further include at least one of the following data obtained from external sources: the geometry of the portion of the route, the road grade of the portion of the route, the allowed speed on the portion of the route, the quality of road surface of the portion of the route, speed limits on the portion of the route, turns on the portion of the route, weather conditions on the portion of the route, its infrastructure, data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, and/or a combination thereof.

3. The method of claim 2, characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is allowed to cross said another portion of the road without stopping, when the first motor vehicle reaches the mandatory deceleration point, an estimated track for the first motor vehicle is generated, wherein the time that the first motor vehicle requires to pass said another portion of the road moving from the mandatory deceleration point to the end point of passing said another portion of the road is also calculated, and wherein the end point of passing said another portion of the road is not located on said another portion of the road and is located along the direction of movement of the first motor vehicle and along the trajectory that intersects said another portion of the road; and, based on the time calculation, an estimated speed profile of the first motor vehicle for the estimated track for the first motor vehicle is generated, wherein the estimated speed profile contains at least the first motor vehicle moving through the mandatory deceleration point while decreasing its speed to full stop in the mandatory stop point, wherein the mandatory stop point is located along the direction of movement of the first motor vehicle and along the trajectory that does not intersect said another portion of the road.

4. The method of claim 3, characterized in that the estimated track for the first motor vehicle is generated taking into account one of the following: data associated with a motor vehicle located on another portion of the route, data associated with a motor vehicle located on the portion of the route at the mandatory deceleration point or in its vicinity, estimation of a motor vehicle being present on another portion of the route, estimation of a motor vehicle being present on the portion of the route at the mandatory deceleration point or in its vicinity, or a combination thereof.

5. The method of claim 2, characterized in that in case when the data associated with the mandatory deceleration point are the data associated with the mandatory deceleration point located on the portion of the road intersected by another portion of the road and when the infrastructure data of the portion of the road contain data obtained from a traffic control means signaling that it is not allowed to cross said another portion of the road without stopping, when the first motor vehicle reaches the mandatory deceleration point, an estimated track for the first motor vehicle is generated, wherein the time when the traffic control means would again signal that it is allowed to intersect said another portion of the road without stopping is also calculated; and, based on the time calculation, the mandatory deceleration point is relocated so as to allow the first motor vehicle to move along the trajectory that intersects said another portion of the route without stopping, when the traffic control means signals that it is allowed to cross said another portion of the road without stopping.

6. The method of claim 5, characterized in that the data associated with the portion of the route include at least data associated with several mandatory deceleration points, wherein the data associated with mandatory deceleration points are data associated with mandatory deceleration points on the portion of the route that are located, respectively, before other portions of the route intersecting said portion of the route, wherein the data obtained from traffic control means are associated with each respective other portion of the route, and wherein the steps of the aforementioned method are performed for each mandatory deceleration point so as to allow the first motor vehicle to move along the trajectories that intersect the other portion of the route without stopping, when the traffic control means of each respective other portion of the route signal that it is allowed to cross said other portion of the route without stopping.

7. The method of claim 2, characterized in that in case the data associated with the portion of the route to be passed by the first motor vehicle further include at least data associated with a motor vehicle located on said another portion of the route, a track for the motor vehicle located on said another portion of the route is generated, wherein said track contains at least data associated with said another portion of the route that motor vehicle is moving along, wherein the data associated with said another portion of the route include data associated with the trajectory of the motor vehicle moving along said another portion of the route, wherein the data associated with the portion of the route to be passed by the first motor vehicle further include data associated with the trajectory of the first motor vehicle, and wherein said trajectory data include data associated with an intersection between the first motor vehicle's trajectory and that of the motor vehicle moving along said another portion of the route, the mandatory deceleration point is relocated so as to prevent the first motor vehicle and the motor vehicle moving along said another portion of the route from reaching said intersection at the same time, while also enabling the first motor vehicle to move along its trajectory without stopping.

8. The method of claim 2, characterized in that in case the data associated with the portion of the route to be passed by the first motor vehicle further include at least data associated with a motor vehicle on the portion of the route at the mandatory deceleration point or in its vicinity, a track for that motor vehicle is generated, and the mandatory deceleration point is relocated so as to generate an estimated track for the first motor vehicle that would correspond to the estimated track for the motor vehicle on the portion of the route at the mandatory deceleration point or in its vicinity, wherein the first motor vehicle is moving along the portion of the route at a lesser speed than the motor vehicle on the portion of the route at the mandatory deceleration point or in its vicinity.

9. The method of claim 2, characterized in that the data associated with the portion of the route to be passed by the first motor vehicle further include at least one of the following: estimation of a motor vehicle being present on another portion of the route, estimation of a motor vehicle being present on the portion of the route at the mandatory deceleration point or in its vicinity, or a combination thereof; wherein in case the data associated with the portion of the route to be passed by the first motor vehicle further include estimation of a motor vehicle being present on said another portion of the route, an estimated track for the motor vehicle that may be present on said another portion of the route is generated, wherein said estimated track contains at least data associated with said another portion of the route that motor vehicle may be moving along, wherein the data associated with said another portion of the route include data associated with the estimated trajectory of the motor vehicle, which may be moving along said another portion of the route, wherein the data associated with the portion of the route to be passed by the first motor vehicle further include data associated with the trajectory of the first motor vehicle, and wherein in case the data associated with the trajectory of the first motor vehicle and the data associated with the estimated trajectory of the motor vehicle, which may be moving along said another portion of the route, include data associated with an intersection between the first motor vehicle's trajectory and the estimated trajectory of the motor vehicle, which may be moving along said another portion of the route, the mandatory deceleration point is relocated so as to prevent the first motor vehicle and the motor vehicle, which may be moving along said another portion of the route, from reaching said intersection at the same time, which may be located on said another portion of the route, while also enabling the first motor vehicle to move along its trajectory without stopping; and wherein in case the data associated with the portion of the route to be passed by the first motor vehicle further include the estimation of a motor vehicle being present on the portion of the route at the mandatory deceleration point or in its vicinity, an estimated track for that motor vehicle is generated, and the mandatory deceleration point is relocated so as to generate an estimated track for the first motor vehicle that would correspond to the estimated track for the motor vehicle, which may be present on the portion of the route to be passed by the first motor vehicle, at the mandatory deceleration point or in its vicinity, wherein the first motor vehicle is moving along the portion of the route at a lesser speed than the motor vehicle, which may be present on the portion of the route to be passed by the first motor vehicle, at the mandatory deceleration point or in its vicinity.

10. The method of claim 2, characterized in that the possible deceleration point on the portion of the route is located in accordance with the data associated with the first motor vehicle.

11. The method of claim 2, characterized in that the step of collecting primary data further involves collecting data associated with the portion of the route, along which the second motor vehicle is moving, wherein the data include at least one of the following: the geometry of the portion of the route, the route grade of the portion of the route, the allowed speed on the portion of the route, the quality of route surface of the portion of the route, speed limits on the portion of the route, turns on the portion of the route, weather conditions on the portion of the route, or its infrastructure, and/or a combination thereof.

12. The method of claim 2, characterized in that the track for the first motor vehicle is generated by performing the following additional steps:

refining the primary data associated with the first motor vehicle based on how it passed the portion of the route;

refining the primary data associated with the portion of the route based on how it was passed by the first motor vehicle;

wherein the refining of the primary data associated with the portion of the route is also based on the data obtained from the environmental sensors of the first motor vehicle.

13. The method of claim 2, characterized.

14. The method of claim 13, characterized in that the estimated track for the first motor vehicle further contains data associated with an estimated acceleration point on the portion of the route, wherein the data associated with the mandatory deceleration point are estimated data associated with the mandatory deceleration point.

15. The method of claim 14, characterized in that the track generated for the first motor vehicle further contains data associated with the actual acceleration point and/or data associated with the actual mandatory deceleration point determined based on how the first motor vehicle passed the given portion of the route.

16. The method of claim 15, characterized in that the track generated for the first motor vehicle further contains the data on mismatches between the data associated with the actual acceleration point and/or data associated with the actual deceleration point and respective data associated with an estimated acceleration point and/or data associated with an estimated deceleration point.

17. The method of claim 16, characterized in that the step of generating a track for the first motor vehicle further comprises a step of obtaining actual data on energy consumption by the first motor vehicle on the portion of the route.

18. The method of claim 17, characterized in that the step of evaluating the energy efficiency of how the first motor vehicle passed the portion of the route involves comparing the estimated data on energy consumption by the first motor vehicle on the portion of the route with the actual data on energy consumption by the first motor vehicle on the portion of the route.

19. The method of claim 18, characterized in that the estimated data on energy consumption by the first motor vehicle on the portion of the route are compared with the actual data on energy consumption by the first motor vehicle on the portion of the route taking into account the speed profile generated for the first motor vehicle.

* * * * *